(12) United States Patent
Shirakawa et al.

(10) Patent No.: US 9,112,743 B1
(45) Date of Patent: Aug. 18, 2015

(54) EQUALIZATION METHOD AND EQUALIZER

(71) Applicant: Panasonic Corporation, Osaka (JP)

(72) Inventors: Yoshinori Shirakawa, Kanagawa (JP);
Naganori Shirakata, Kanagawa (JP);
Koichiro Tanaka, Hyogo (JP); Hiroyuki Motozuka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/620,177

(22) Filed: Feb. 11, 2015

(30) Foreign Application Priority Data

Feb. 21, 2014 (JP) ................... 2014-031965

(51) Int. Cl.
*H04L 25/03* (2006.01)
*H04L 25/02* (2006.01)
*H04B 1/12* (2006.01)
*H04L 27/26* (2006.01)

(52) U.S. Cl.
CPC .......... *H04L 25/03891* (2013.01); *H04B 1/123* (2013.01); *H04L 25/0202* (2013.01); *H04L 27/265* (2013.01)

(58) Field of Classification Search
USPC ............... 375/229, 350, 233, 347; 455/272
See application file for complete search history.

(56) References Cited

U.S. PATENT DOCUMENTS

| | | | |
|---|---|---|---|
| 6,954,495 B2 * | 10/2005 | Piirainen | 375/233 |
| 7,466,969 B2 * | 12/2008 | Kimata et al. | 455/272 |
| 7,684,529 B2 * | 3/2010 | Chimitt et al. | 375/350 |
| 8,891,709 B2 * | 11/2014 | Kolze et al. | 375/350 |
| 8,913,700 B1 * | 12/2014 | Moshavi et al. | 375/347 |
| 2003/0185291 A1 * | 10/2003 | Nakahira et al. | 375/229 |

FOREIGN PATENT DOCUMENTS

| | | |
|---|---|---|
| JP | 2006-245810 | 9/2006 |
| JP | 2008-539676 | 11/2008 |
| WO | 2006/116617 | 11/2006 |

* cited by examiner

*Primary Examiner* — Eva Puente
(74) *Attorney, Agent, or Firm* — Seed IP Law Group PLLC

(57) ABSTRACT

An equalization method includes carrying out frequency domain conversion of M received signals into a 2M received vector having 2M elements, carrying out channel estimation and noise/interference estimation based on the 2M vector, calculating a 2M channel vector and a (2M)×(2M) noise/interference matrix, selecting a 2M−1 or less channel vector from the calculated 2M channel vector, selecting a (2M−1)×(2M−1) or less noise/interference matrix from the calculated (2M)×(2M) noise/interference matrix, calculating a 2M−1 or less equalization coefficient vector as equalization coefficients based on the selected 2M−1 channel vector and the selected (2M−1)×(2M−1) noise/interference matrix, selecting a 2M−1 or less received vector from the 2M received vector, and equalizing the selected 2M−1 received vector by using the calculated. equalization coefficients.

10 Claims, 14 Drawing Sheets

FIG. 4
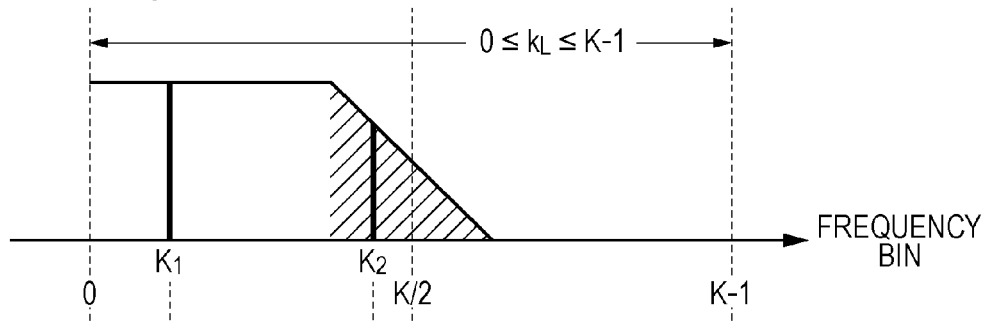
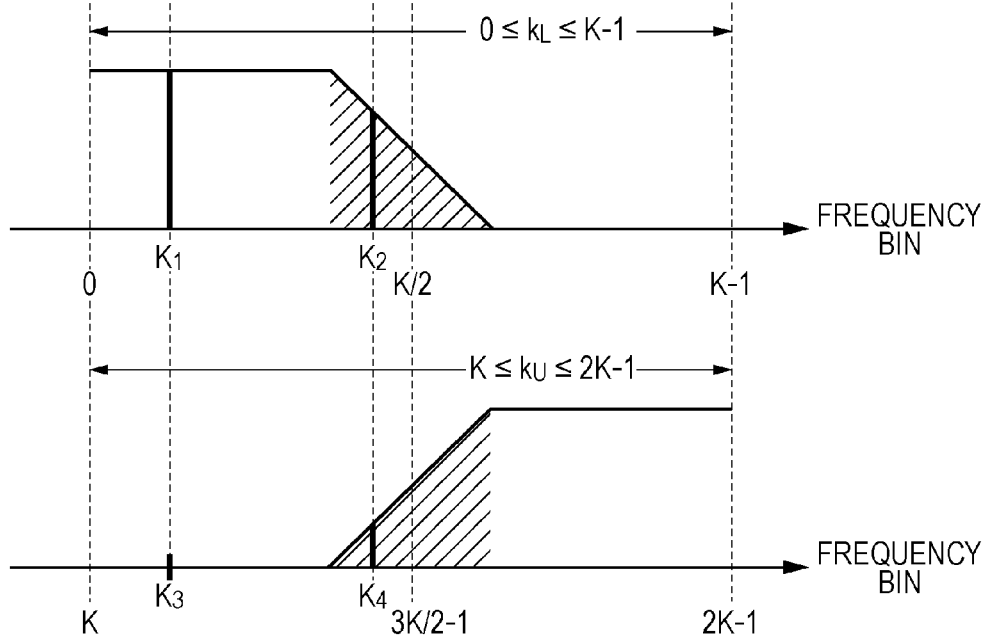

EQUALIZATION METHOD AND EQUALIZER

CROSS REFERENCES TO RELATED APPLICATIONS

This application claims priority to Japanese Patent Application No. 2014-031965, filed on Feb. 21, 2014, the contents of which are hereby incorporated by reference.

BACKGROUND

1. Technical Field

The present disclosure relates to an equalization method and an equalizer applicable to a radio communication apparatus.

2. Description of the Related Art

In a radio communication apparatus, a transmitter carries out coding of a transmission signal, interleaving, modulation, scrambling, and generation of a symbol signal. Modulation speed in the modulation is referred to as a symbol rate. The transmitter filters the symbol signal to generate a sampled signal, inputs the sampled signal to a mixer with a carrier signal, generates a radio frequency (RF) signal, and transmits the RF signal to a receiver.

To the transmitted RR signal, channel characteristics of a transmission channel and interference are added by the time when the RF signal reaches the receiver, and noise is further added in the receiver.

The receiver carries out mixing of the received RF signal, and then carries out time sampling of a complex signal by an analog-to-digital converter (ADC). The receiver filters the sampled signal, and then converts the filtered signal to a frequency domain signal by a discrete Fourier transformation (DFT) or a fast Fourier transformation (FFT). The receiver equalizes the frequency domain signal, and then converts the equalized signal into a time domain signal by an inverse discrete Fourier transformation (IDFT) or an inverse fast Fourier transformation (IFFT) to obtain a symbol signal. The receiver carries out descrambling of the symbol signal, demodulation, de-interleaving, decoding, and regeneration of the transmitted signal. In the series of processing of the receiver, the equalization eliminates channel characteristics and interference between the transmitter and the receiver.

Examples of equalization according to the related art are described in, for example, Japanese Unexamined Patent Application Publication No. 2006-245810 and Japanese Patent No. 5166246.

Japanese Unexamined Patent Application. Publication No. 2006-245810 describes a technique in which, in a receiver with a single antenna system, when a sampling frequency of an ADC in the receiver is higher than twice the symbol rate (for the purpose of simplification, it is assumed that the sampling frequency is twice the symbol rate), equalization is carried out by combining specific frequencies to calculate equalization coefficients.

Japanese Patent No. 5166246 describes a technique in which, in a receiver with two antenna systems (for the purpose of simplification, the receiver is assumed to have two antenna systems), when the sampling frequency of an ADC in the receiver is twice the symbol rate, equalization is carried out by combining specific frequencies through an inverse matrix operation for a 4×4 matrix, which has complex number elements, to calculate equalization coefficients.

SUMMARY

Japanese Patent No. 5166246 described above assumes a radio communication system using the code division multiple access (CDMA), the time division multiple access (TDMA), the frequency division multiple access (FDMA), the orthogonal frequency division multiple access (OFDMA), or the single-carrier FDMA (SC-FDMA), and with a carrier frequency of 1 to 5 GHz and a symbol rate in the order of Mbps.

In a radio communication system with a symbol rate in the order of Mbps, a receiver is desired to have an ADC which carries out time sampling with a high precision and to calculate equalization coefficients with high precision. Thus, the receiver is also desired to have a processor which calculates a 4×4 inverse matrix, the calculation of which accompanies a large amount of operations. However, because the system operates with a symbol rate in the order of Mbps, a sufficient processing speed of the processor has been achieved.

In the above-described radio communication system with a symbol rate in the order of Mbps, the receiver is assumed to be a mobile phone or a radio base station. Thus, although there is interference from other channels, because a distance between an interfering station and the receiver is longer than a distance between a desired station and the receiver, influence of interference from the interfering station has not been significant.

However, in the radio communication standard WiGig® or IEEE 802.11ad, which uses a carrier frequency of 60 GHz, because a radio communication system uses a symbol rate in the order of Gbps, a processing speed of a processor is not sufficient. Thus, it is desirable to carry out an inverse matrix operation of a 4×4 matrix by an operational circuit. However, because of a large amount of operations, implementation in circuitry is difficult. Even if the implementation in circuitry is achieved, another problem in that the circuitry consumes a lot of power is caused.

In IEEE 802.11ad, short distance radio communication is assumed. Thus, there may be a high possibility that a distance between an interfering station and a receiver is shorter than a distance between a desired station and the receiver, which causes a problem of significant influence from the interfering station.

Thus, one non-limiting and exemplary embodiment provides an equalization method and an equalizer which reduce an amount of operations for performing equalization in a receiver with multiple receiving systems.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature an equalization method, the method including, in a receiver with multiple antennas, carrying out frequency domain conversion of M received signals by multiple antennas into a 2M received vector including 2M elements, carrying out channel estimation and noise/interference estimation based on the 2M received vector, calculating a 2M channel vector and a (2M)×(2M) noise/interference matrix, selecting a 2M−1 or less channel vector from the calculated 2M channel vector and selecting a (2M−1)×(2M−1) or less noise/interference matrix from the calculated (2M)×(2M) noise/interference matrix, based on quality of the received signals, calculating a 2M−1 or less equalization coefficient vector as equalization coefficients based on the 2M−1 or less channel vector and the (2M−1)×(2M−1) or less noise/interference matrix, selecting a 2M−1 or less received vector from the 2M received vector, and equalizing the 2M−1 or less received vector by using the equalization coefficients. In the equalization method, the 2M received vector and the 2M channel vector are vectors having 2M elements each of which is a complex number. The (2M)×

(2M) noise/interference matrix is a matrix having (2M)×(2M) elements each of which is a complex number. The 2M−1 or less equalization coefficient vector is a vector having 2M−1 or less elements each of which is a complex number.

In another general aspect, the techniques disclosed here feature an equalizer including a frequency domain converter which carries out frequency domain conversion of M systems of received signals received by multiple antennas into a 2M received vector having 2M elements, a channel and noise/interference estimator which carries out channel estimation and noise/interference estimation based on the 2M received vector to calculate a 2M channel vector and a (2M)×(2M) noise/interference matrix, a first selector which selects a 2M−1 or less channel vector from the calculated 2M channel vector and selects a (2M−1)×(2M−1) or less noise/interference matrix from the calculated (2M)×(2M) noise/interference matrix, based on quality of the received signals, an equalization coefficient calculator which calculates a 2M−1 or less equalization coefficient vector as equalization coefficients based on the 2M−1 or less channel vector and the (2M−1)×(2M−1) or less noise/interference matrix, a second selector which selects a 2M−1 or less received vector from the 2M received vector, and a frequency domain equalizer which equalizes the 2M−1 or less received vector by using the equalization coefficients.

These general and specific aspects may be implemented using a system, a method, and a computer program, and any combination of systems, methods, and computer programs.

According to the present disclosure, it is possible to reduce an amount of operations for performing equalization in a receiver with multiple receiving systems.

BRIEF DESCRIPTION OF THE DRAWINGS

FIG. 4 is a diagram illustrating frequency response revised from the frequency response illustrated in FIG. 3 by dividing frequency bins into the lower side $k_L$ and the upper side $k_U$, and combining portions of frequency response corresponding to the divided frequency bins;

DETAILED DESCRIPTION

Underlying Knowledge Forming Basis of the Present Disclosure

Before embodiments of an equalization method and an equalizer according to the present disclosure are described, an illustrative example of equalization on a receiver having multiple antenna systems will be described first.

In the following description, a complex number that is an element in the time domain is denoted by a lowercase letter with an index n in a sample period, for example, h(n). A complex number that is an element in the frequency domain is denoted by an uppercase letter with an index k of a frequency bin, for example, H(k). A vector is assumed to contain a plurality of elements, each of which is an afore-mentioned complex number, and is denoted by a lowercase letter with an underscore, for example, $\underline{h}$. A matrix is denoted by an uppercase letter with an underscore, for example, $\underline{H}$.

Figure 2:
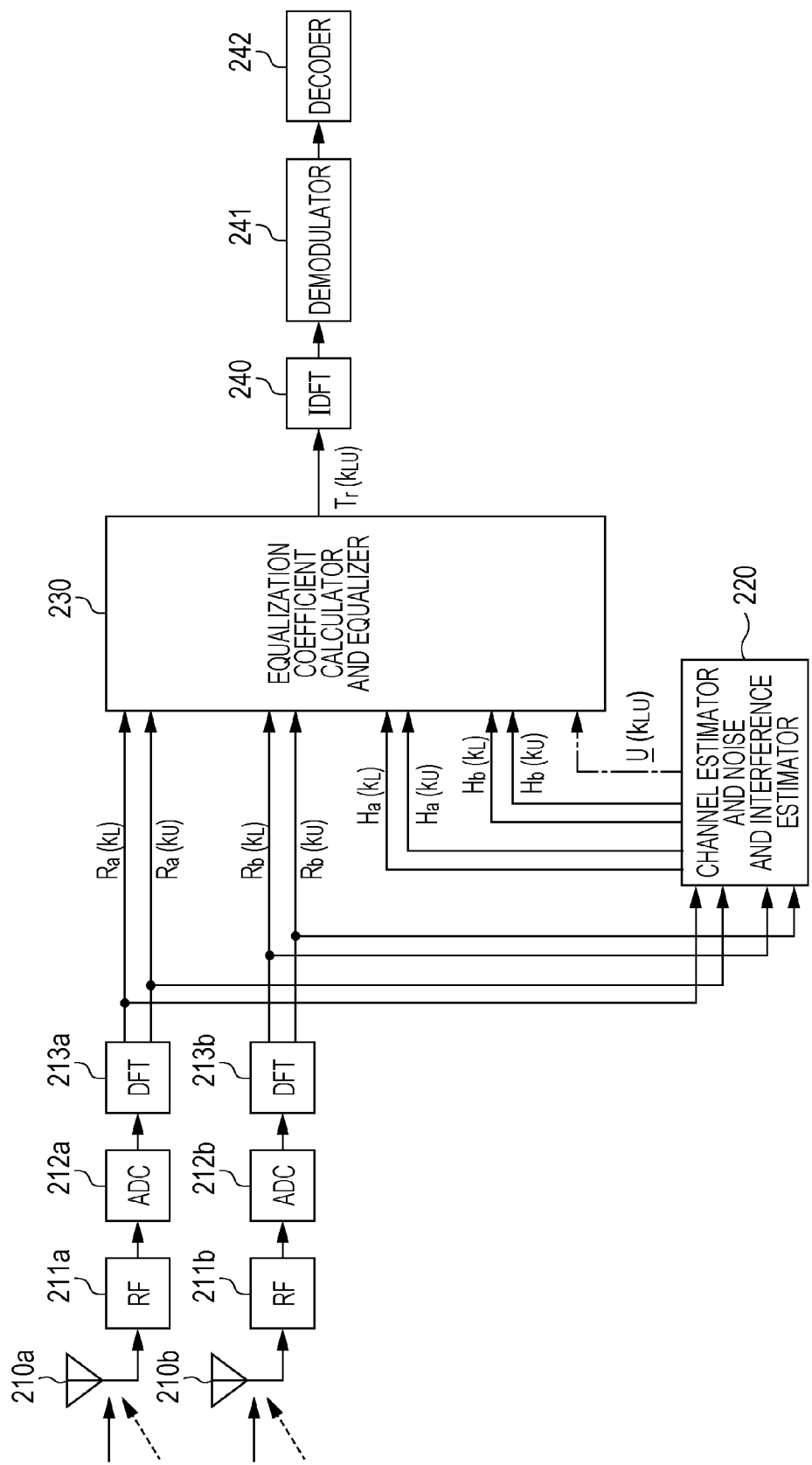
FIG. 2 is a block diagram illustrating a configuration of a receiver which has two antenna systems.

FIG. 2 is a block diagram illustrating a configuration of a receiver which includes R (R=2) antenna systems. The receiver includes antennas 210a and 210b, RF processors 211a and 211b, ADCs 212a and 212b, DFTs 213a and 213b, a channel and noise/interference estimator 220, an equalization coefficient calculator and equalizer 230, an IDFT 240, a demodulator 241, and a decoder 242. In FIG. 2, solid arrows denote complex numbers, each of which is an element in a vector or a matrix, and dashed arrows denote matrices.

The antennas 210a and 210b receive RF signals from a transmitter. For the purpose of simplicity, transmission power is normalized to a mean value of 1.0. The RF signals, to which, while being transmitted from the transmitter to the receiver, channel characteristics between the transmitter and the receiver are added, and interference waves from a source other than the desired transmitter are also added, are received by the antennas 210a and 210b.

The RF processors 211a and 211b convert the received the RF signals to baseband signals, which are complex signals. In the conversion, noise such as a thermal noise from a circuit in the receiver is added to the baseband signals.

In the ADCs 212a and 212b, the baseband signals, which are complex signals, are sampled at C (C≥1) times of a symbol rate and converted no digital complex baseband signals $\underline{r}(n)$, which is expressed by the formula (1). In the following description, for the purpose of illustration, an oversampling multiple C is assumed to be 2.

$$\underline{r}(n) = [r_a(n)\ r_b(n)]^T \quad (1)$$

where $^T$ denotes a transpose.

In the above formula, the complex baseband signal $r_a(n)$ on the system of antenna a is expressed by the formula (2).

$$r_a(n) = FIR(h_a(n) \cdot t(n)) + i_a(n) + no_a(n) \quad (2)$$

where FIR( ) denotes a finite impulse response (FIR) filter, t(n) denotes a sampled transmission signal, $h_a(n)$ denotes a channel of the system of antenna a,
$i_a(n)$ denotes an interference, and
$no_a(n)$ denotes a noise.

The channel, denoted by $h_a(n)$ in the formula (2), is a frequency response to which channel characteristics between the transmitter and the receiver and transmit and receive filter characteristics are added.

The DFTs 213a and 213b work as a frequency domain converter, which carries out frequency domain conversion of the digital complex baseband signal $\underline{r}(n)$ to acquire a received vector $\underline{r}(k)$ in the frequency domain, which is expressed by the formula (3).

$$\underline{r}(k) = [R_a(k)\ R_b(k)]^T$$

$$R_a(k) = H_a(k) \cdot T(k) + I_a(k) + NO_a(k)$$

$$0 \le k \le 2K-1 \tag{3}$$

In the formula (3), k denotes a frequency bin. K denotes the number of points of DFT when the symbol rate C is 1.

The channel and noise/interference estimator 220, from the received vector $\underline{r}(k)$ in the frequency domain, estimates a channel $\underline{h}(k)$ as a channel vector and an undesired signal matrix $\underline{U}(k)$ as a noise/interference matrix which represents noise and interference collectively.

In FIG. 2, $R_a(k_L)$, $R_a(k_U)$, $R_b(k_L)$, $R_b(k_U)$, $H_a(k_L)$, $H_a(k_U)$, $H_b(k_L)$, and $H_b(k_U)$ denote complex signals in individual frequency bins, respectively. $\underline{U}(k_{LU})$ denotes a vector which has signal components in individual frequency bins. The denotations apply to other drawings.

Although various computation methods may be used for the channel and noise/interference estimator 220, the channel $\underline{h}(k)$ is computed by extracting reference signals for a certain period from among the received vectors $\underline{r}(k)$ and multiplying the extracted reference signals with an original reference signals. The undesired signal matrix $\underline{U}(k)$ is computed as an expected value of a complex conjugate covariance as expressed by the formulae (4) and (5).

$$\underline{u}(k) = [I_a(k) + NO_a(k)\ I_b(k) + NO_b(k)]^T \tag{4}$$

$$= [U_a(k)\ U_b(k)]^T$$

$$\underline{U}(k) = E[\underline{u}(k) \cdot \underline{u}^H(k)] \tag{5}$$

where $E[\ ]$ denotes an expectation operation, and $^H$ denotes a complex conjugate transpose.

Figure 3:
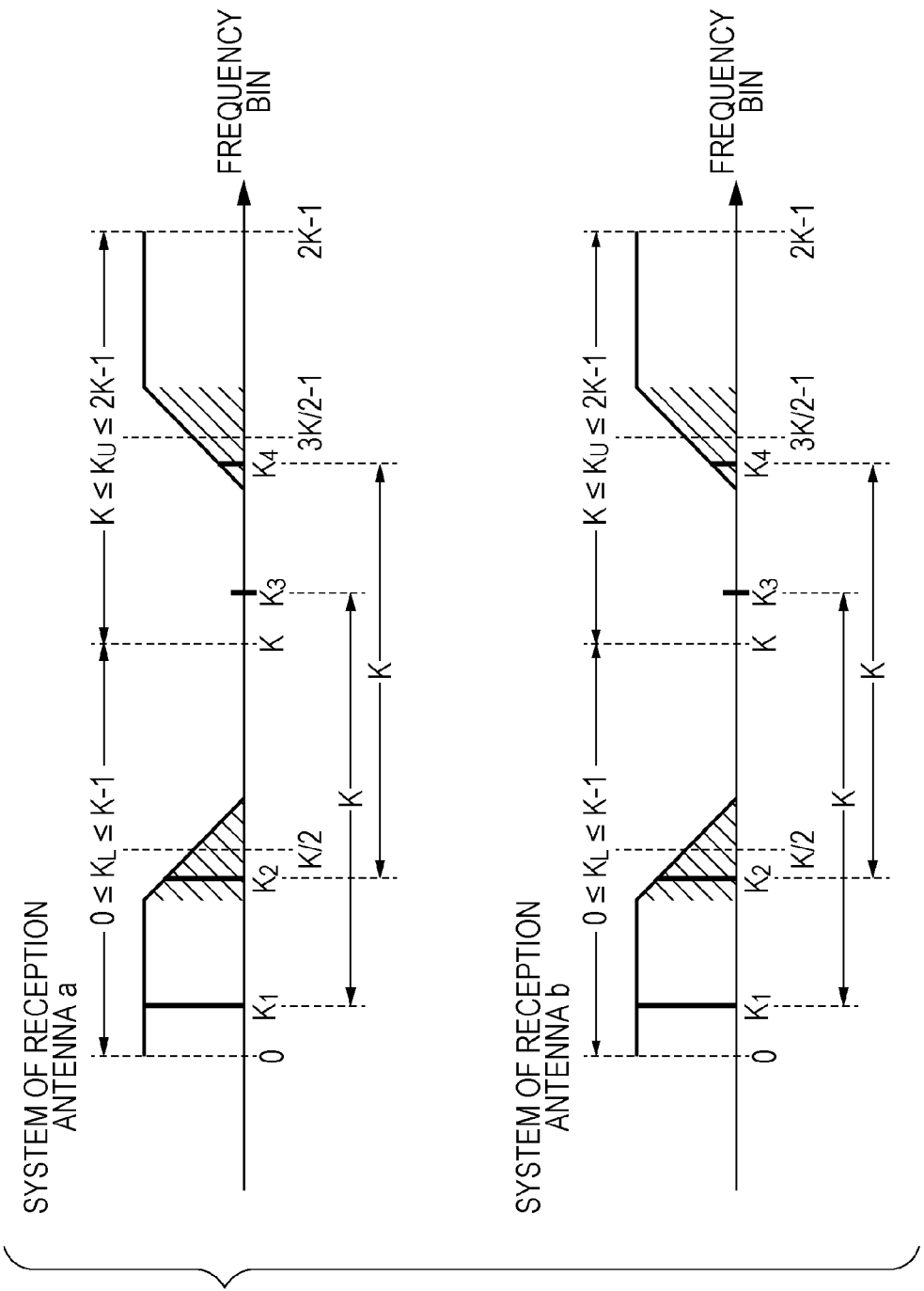
FIG. 3 is a diagram illustrating a frequency response of received signals on multiple receiving antenna systems in a case in which two antenna systems are used and two-times oversampling is employed.

FIG. 3 is a diagram illustrating a frequency response of received signals on a plurality of receiving antenna systems in a case of R=2 and C=2, i.e. a case in which two antenna systems are used and two-times oversampling is employed. In this case, filters on the transmitter are assumed to be roll-off filters. In FIG. 3, a frequency bin K corresponds to a symbol rate frequency $f_{sym}$.

FIG. 4 illustrates a case in which frequency bins in the frequency response illustrated in FIG. 3 are partitioned into the lower side $k_L$ and the upper side $k_U$. In FIGS. 3 and 4, the received vector $\underline{r}(k)$ in the frequency domain is expressed by the formula (6).

$$\underline{r}(k) = \underline{r}(k_{LU}) = [R_a(k_L)\ R_a(k_U)\ R_b(k_l)\ R_b(k_U)]^T$$

$$0 \le k_{LU} \le K-1$$

$$0 \le k_L \le K-1$$

$$K \le k_U \le 2K-1$$

$$k_U = k_L + K \tag{6}$$

The channel $\underline{h}(k)$ and the undesired signal matrix $\underline{U}(k)$, which includes noise and interference, are computed by channel and noise/interference estimator 220 by the formulae (7) and (8).

$$\underline{h}(k) = \underline{h}(k_{LU}) = [H_a(k_L)\ H_a(k_U)\ H_b(k_L)\ H_b(k_U)]^T \tag{7}$$

$$\underline{U}(k) = \underline{U}(k_{LU}) = \tag{8}$$

$$E\begin{bmatrix} u_a(k_L) \cdot u_a^*(k_L) & u_a(k_L) \cdot u_a^*(k_U) & u_a(k_L) \cdot u_b^*(k_L) & u_a(k_L) \cdot (k_U) \\ u_a(k_U) \cdot u_a^*(k_L) & u_a(k_U) \cdot u_a^*(k_U) & u_a(k_U) \cdot u_b^*(k_L) & u_a(k_U) \cdot (k_U) \\ u_b(k_L) \cdot u_a^*(k_L) & u_b(k_L) \cdot u_a^*(k_U) & u_b(k_L) \cdot u_b^*(k_L) & u_b(k_L) \cdot (k_U) \\ u_b(k_U) \cdot u_a^*(k_L) & u_b(k_L) \cdot u_a^*(k_U) & u_b(k_U) \cdot u_b^*(k_L) & u_b(k_U) \cdot (k_U) \end{bmatrix}$$

where * denotes a complex conjugate.

In the formula (8), diagonal elements of $\underline{U}(k)$ indicate power and non-diagonal elements indicate correlations between antennas.

Figure 5:
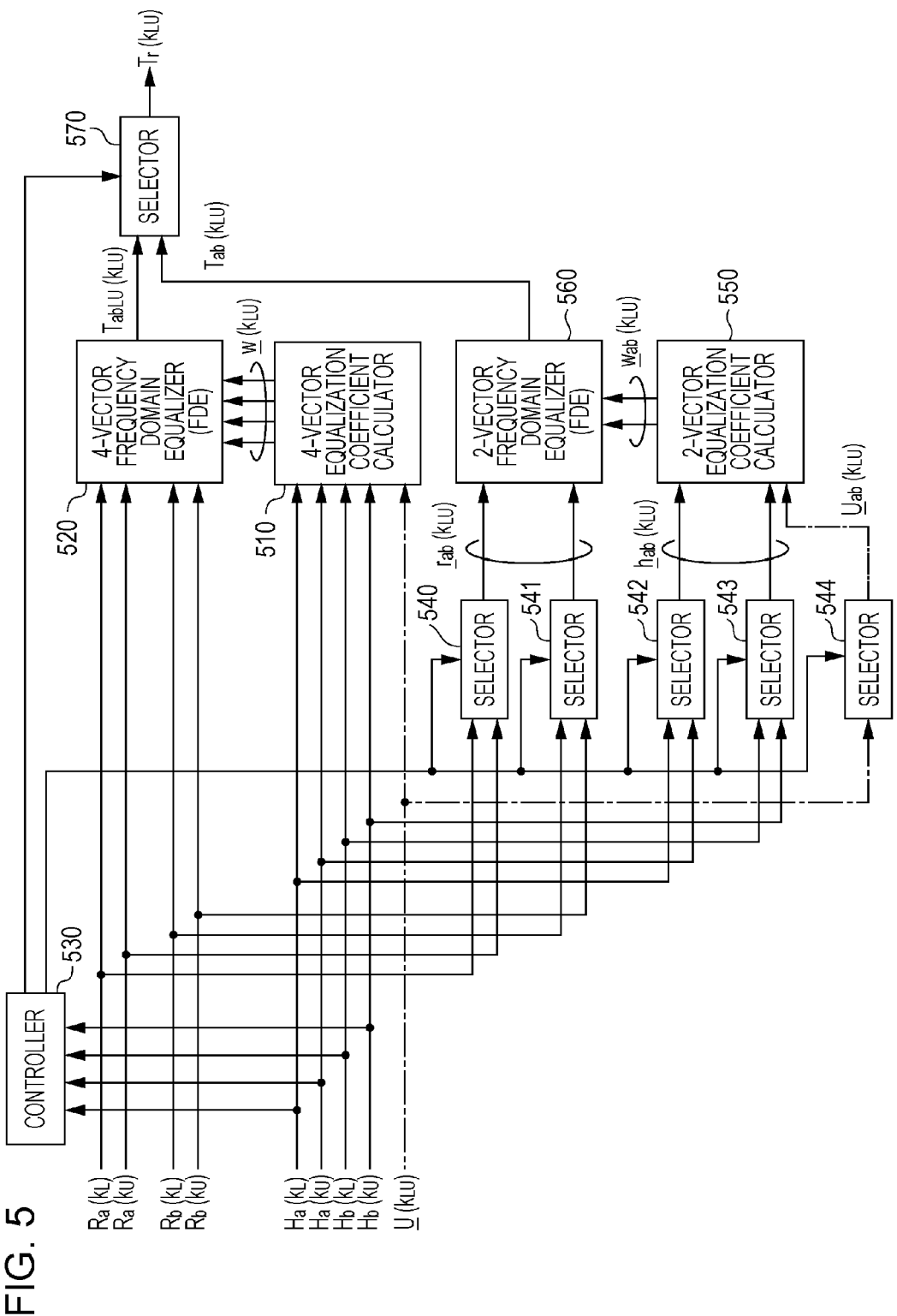
FIG. 5 is a diagram illustrating a configuration example of an equalization coefficient calculator and equalizer in the receiver illustrated in FIG. 2.

FIG. 5 is a diagram illustrating a configuration example of the equalization coefficient calculator and equalizer in the receiver illustrated in FIG. 2. The equalization coefficient calculator and equalizer includes a 4-vector equalization coefficient calculator 510, a 4-vector frequency domain equalizer 520, a controller 530, selectors 540 to 544, a 2-vector equalization coefficient calculator 550, a 2-vector frequency domain equalizer 560, and a selector 570. In FIG. 5, solid arrows other than the signals output from the controller indicate complex numbers, each of which is an element of a vector or a matrix, and dashed arrows indicate matrices.

The 4-vector equalization coefficient calculator 510 calculates a 1×4 equalization coefficient vector $\underline{w}(k_{LU})$, which is expressed by the formula (9), by the minimum mean square error (MMSE) criterion.

$$\underline{w}(k_{LU}) = \underline{h}^H(k_{LU}) \cdot [\underline{h}(k_{LU}) \cdot \underline{h}^H(k_{LU}) + \underline{U}(k_{LU})]^{-1} \tag{9}$$

where $[\ ]^{-1}$ denotes an inverse matrix operation.

The equalization is in general accomplished by carrying out vector multiplication of a frequency domain received vector $\underline{r}(k_{LU})$ by an equalization coefficient vector $\underline{w}(k_{LU})$ and is expressed by the formula (10). The 4-vector frequency domain equalizer 520 calculates an equalized output $T_r(k_{LU})$ by the formula (10).

$$T_r(k_{LU}) = \underline{w}(k_{LU}) \cdot \underline{r}(k_{LU}) \tag{10}$$

where $T_r(k_{LU})$ is a frequency domain converted signal of a transmitted symbol signal, estimated from the received signal.

As illustrated in FIG. 4, the frequency response of the received signal includes, due to the roll-off filter of the transmitter, frequency bins at which signals become substantially zero and frequency bins at which signals form a slope. The range of the slope is determined, by a roll-off rate α by the formula (11).

$$K - \alpha \frac{K}{2} \le k \le K + \alpha \frac{K}{2} - 1 \tag{11}$$

$$\frac{3}{2}K - \alpha \frac{K}{2} \le k \le \frac{3}{2}K + \alpha \frac{K}{2} - 1$$

Frequency bins $K_2$ and $K_4$, located in the range of the slope, form a pair, and an equalized signal $T_{abLU}(k_{LU})$ is calculated by the above-described formula (10).

In the frequency response of the received signal illustrated in FIG. 4, a frequency bin $K_3$ at which the signal is substantially zero exists. The frequency bin $K_3$ and a frequency bin $K_1$ form a pair, and, because replacing the signal at $K_3$ with zero causes terms related to $K_3$ in the formulae (7) and (8) to be zero, the terms related to $K_3$ do not have to be calculated. Thus, frequency bins at which the signals are substantially zero are excluded from calculation objects by the selectors 540 to 544 in FIG. 5. The selectors 540 to 544 select signals by following commands of control signals from the controller 530. The 2-vector equalization coefficient calculator 550 calculates a 1×2 equalization coefficient vector $\underline{w}_{ab}(k_{LU})$. The 2-vector frequency domain equalizer 560 carries out equalization to calculate an equalized output $T_{ab}(k_{LU})$.

The selector 570 selects $T_{ab}(k_{LU})$ and $T_{abLU}(k_{LU})$ to obtain a frequency domain converted signal $T_r(k_{LU})$ of the transmitted symbol signal estimated from the received signals. The selector 570, by following commands in control signals from the controller 530, selects either of the output signals.

Although, in the example of the receiver illustrated in FIGS. 2 and 5, the calculation is simplified by selection of frequency bins as described above, it is necessary to calculate a 4×4 inverse matrix in a specific range in the formula (9).

There is a problem in that circuit implementation of the inverse matrix operation of a 4×4 matrix is difficult, and, even if the circuit implementation is possible, an implemented circuit consumes a significant amount of power.

Accordingly, in the following embodiments, examples of equalization methods and equalizers by which an amount of operations needed for equalization on a receiver having multiple receiving systems is reduced and calculation of equalization coefficients is simplified, the circuit implementation of which is easy, and which consume a low power will be described.

First Embodiment

Figure 1:
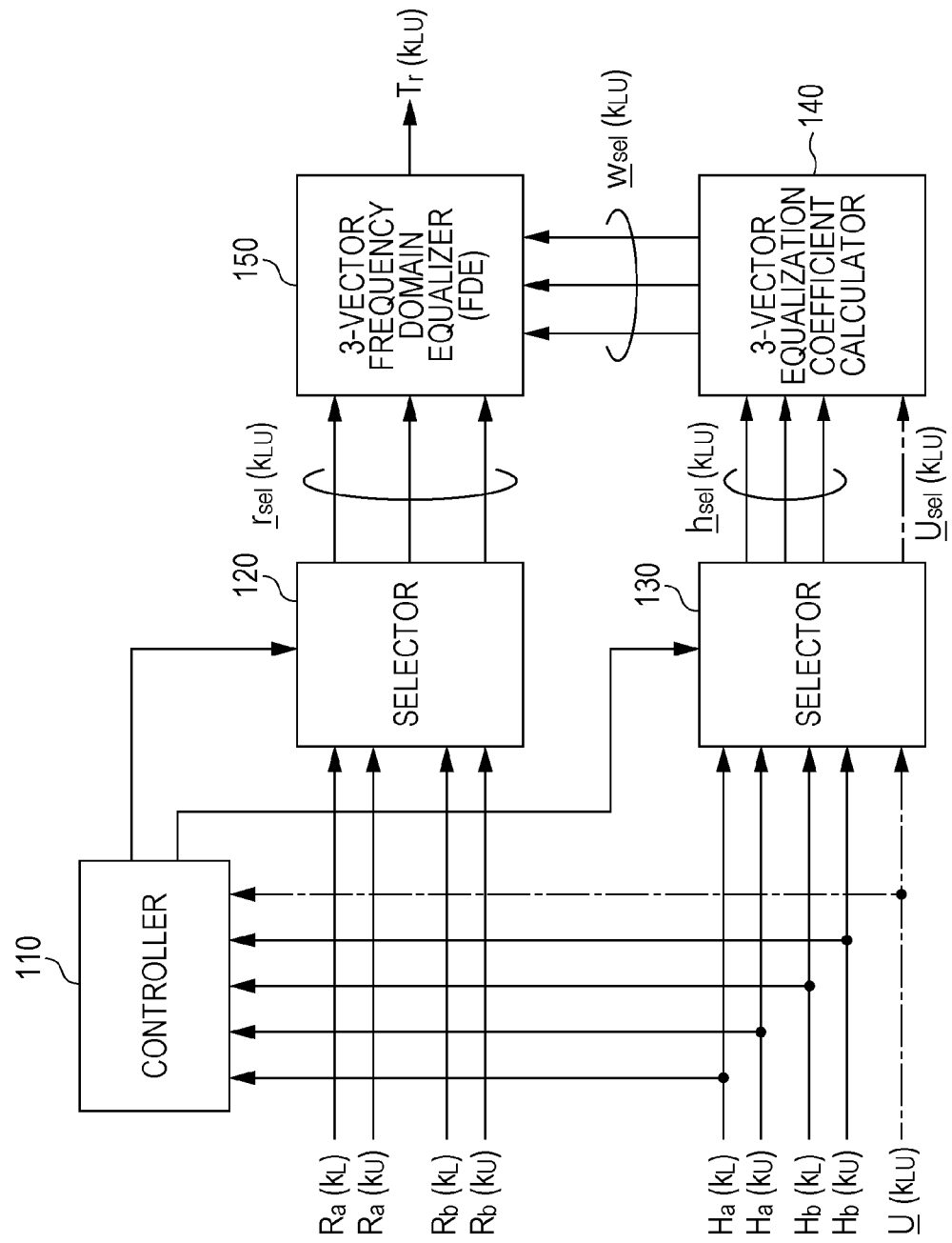
FIG. 1 is a diagram illustrating a configuration of an equalization coefficient calculator and equalizer usable in a receiver of a first embodiment of the present disclosure.

FIG. 1 illustrates a configuration of an equalization coefficient calculator and equalizer usable for a receiver of a first embodiment of the present disclosure, which is equivalent to a configuration of the above-described equalization coefficient calculator and equalizer of the receiver illustrated in FIG. 2.

The equalization coefficient calculator and equalizer in the receiver includes a controller 110, selectors 120 and 130, a 3-vector equalization coefficient calculator 140, and a 3-vector frequency domain equalizer 150. In FIG. 1, solid arrows other than the signals output from the controller indicate complex numbers, each of which is an element of a vector or a matrix, and dashed arrows indicate matrices.

In FIG. 1, the controller 110, based on a channel $\underline{h}(k_{LU})$ and an undesired signal matrix $\underline{U}(k_{LU})$, calculates signal power values $|H_a(k_L)|^2$, $|H_a(k_U)|^2$, $|H_b(k_L)|^2$, and $|H_b(k_U)|^2$ of each vector at each frequency bin, and selects diagonal elements in $\underline{U}(k_{LU})$, which indicates power values of undesired signals. Based on the signal power values and the diagonal elements, the controller 110 calculates ratios of signal power values to power values of undesired signals (signal to interference and noise ratio (SINR)) $SINR_a(k_L)$, $SINR_a(k_U)$, $SINR_b(k_L)$, and $SINR_b(k_U)$.

The selector 120 selects a predefined number of signals from a frequency domain received vector $\underline{r}(k^{LU})$ based on quality of the received signals by following commands of control signals from the controller 110. As an example, the selector 120 selects three signals from the frequency domain received vector $\underline{r}(k_{LU})$, which is a 4-vector, in descending order of the calculated SINRs to generate a 3-vector $\underline{r}_{sel}(k_{LU})$.

The selector 130 selects a predefined number of signals from the channel $\underline{h}(k_{LU})$ as a channel vector based on quality of the received signals by following commands of control signals from the controller 110. As an example, the selector 130 selects three signals from the channel $\underline{h}(k_{LU})$, which is a 4-vector, in descending order of the calculated SINRs to generate a 3-vector $\underline{h}_{sel}(k_{LU})$. The selector 130 selects a predefined number of signals from the undesired signal matrix $\underline{U}(k_{LU})$ as a noise/interference matrix based on quality of the received signals by following commands of control signals from the controller 110. As an example, the selector 130 selects 3×3 signals from the 4×4 undesired signal matrix $\underline{U}(k_{LU})$ to generate $\underline{U}_{sel}(k_{LU})$.

With the above-described processing, it becomes possible for the 3-vector equalization coefficient calculator 140 and the 3-vector frequency domain equalizer 150 to carry out processing by vector operations with 3 or less dimension.

In the above-described processing example, the 3-vector equalization coefficient calculator 140 calculates an equalization coefficient vector, which is a 3-vector, as equalization coefficients based on the generated channel $\underline{h}_{sel}(k_{LU})$ and undesired signal matrix $\underline{U}_{sel}(k_{LU})$. The 3-vector frequency domain equalizer 150 carries out equalization of the received vector $\underline{r}_{sel}(k_{LU})$, which is a 3-vector, by using the calculated equalization coefficient vector, which is a 3-vector.

Figure 6:
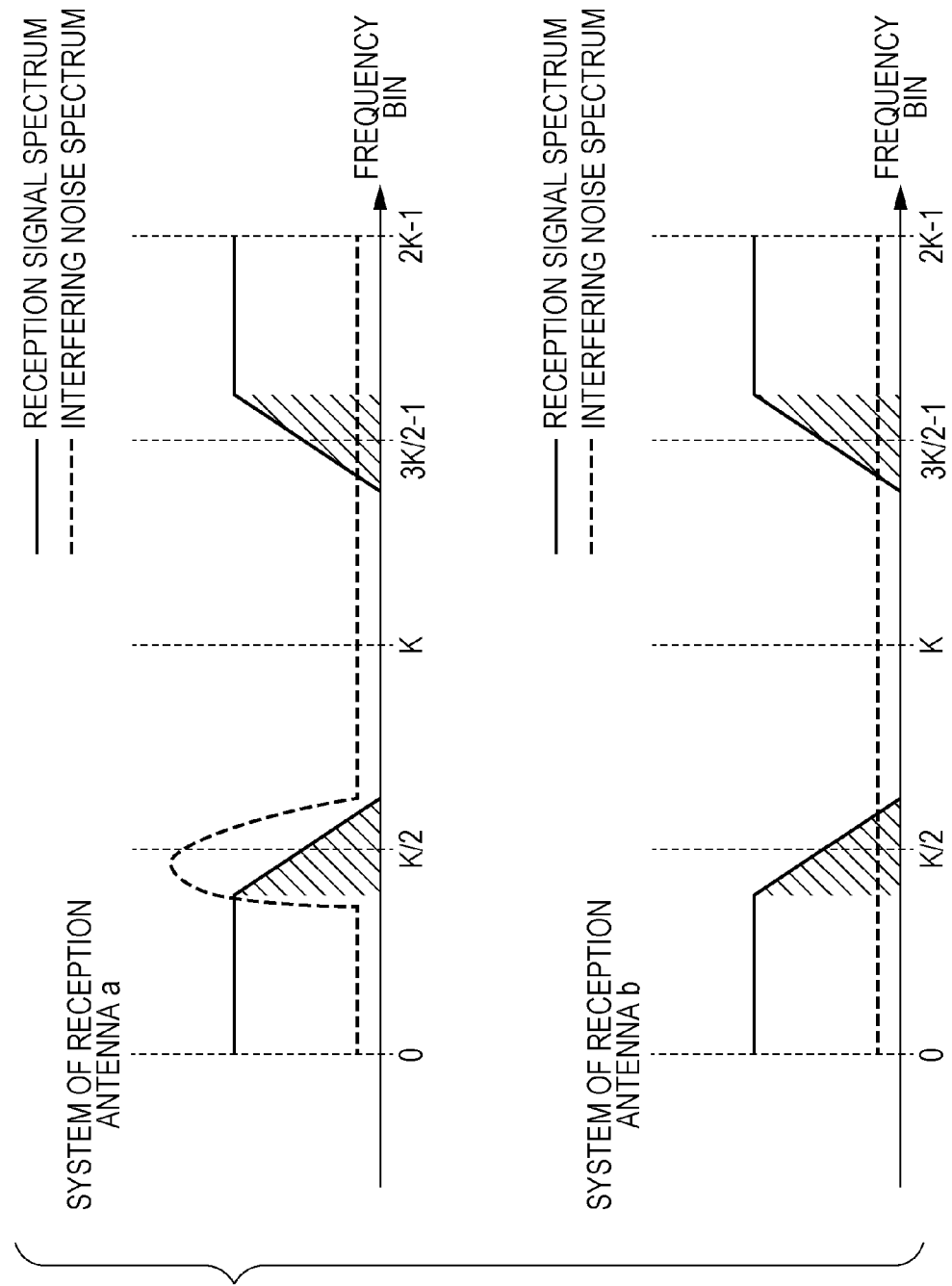
FIG. 6 is a diagram illustrating frequency response when adjacent channel interference is produced on one of the reception systems.
Figure 7:
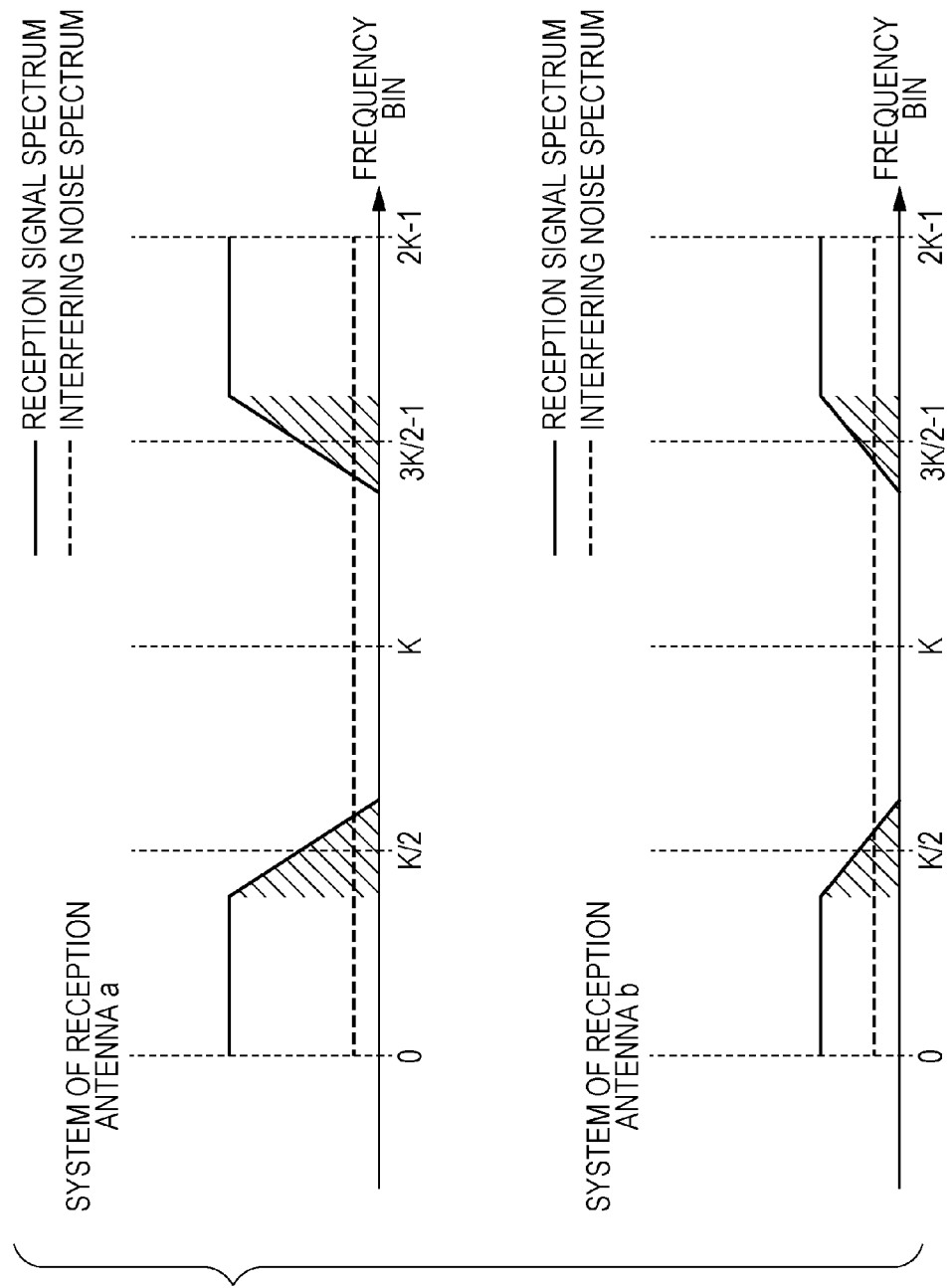
FIG. 7 is a diagram illustrating frequency response when received signal power is low on one of the receiving antenna.
Figure 8:
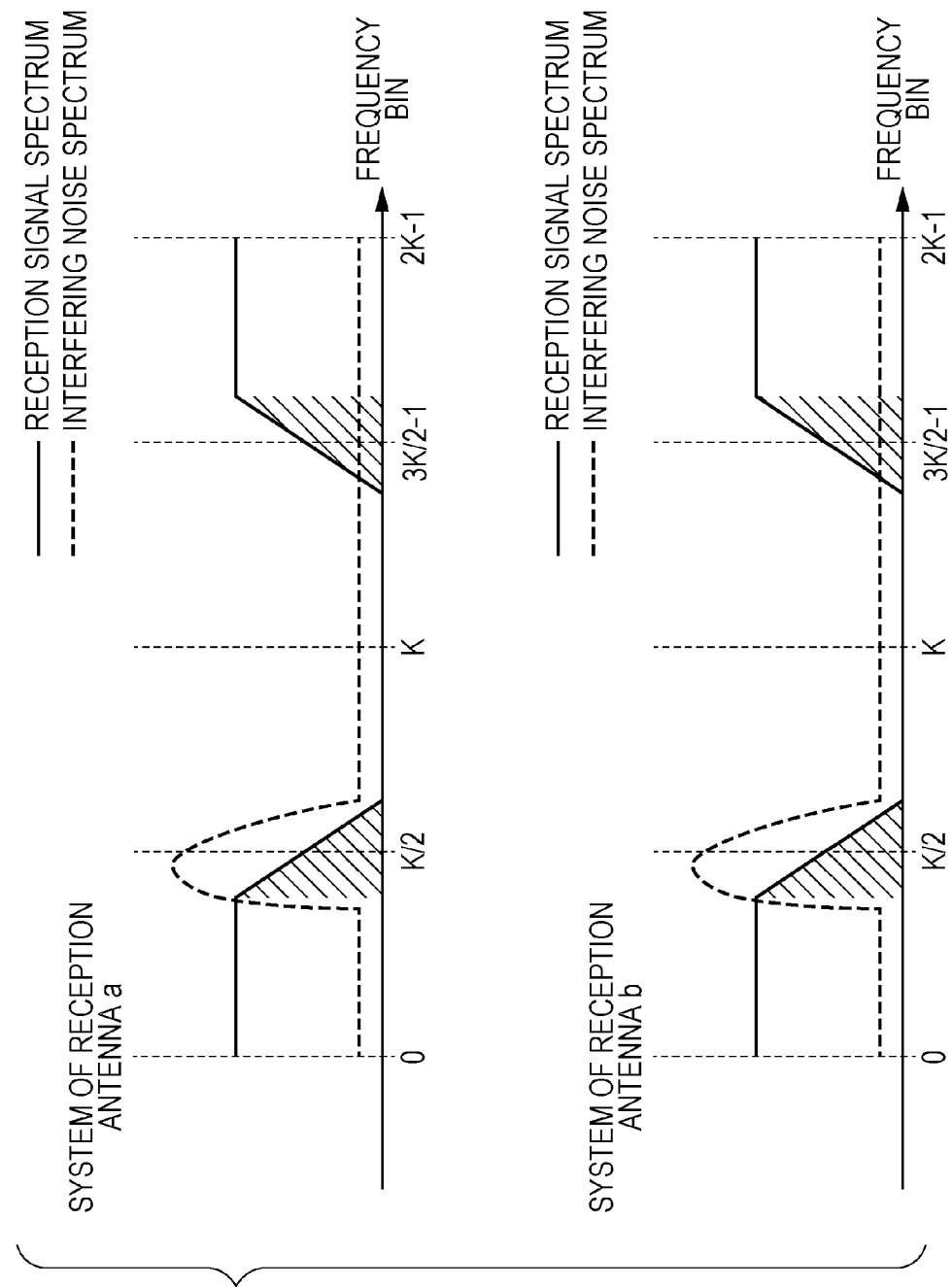
FIG. 8 is a diagram illustrating frequency response when adjacent channel interference is produced on both receiving systems.
Figure 9:
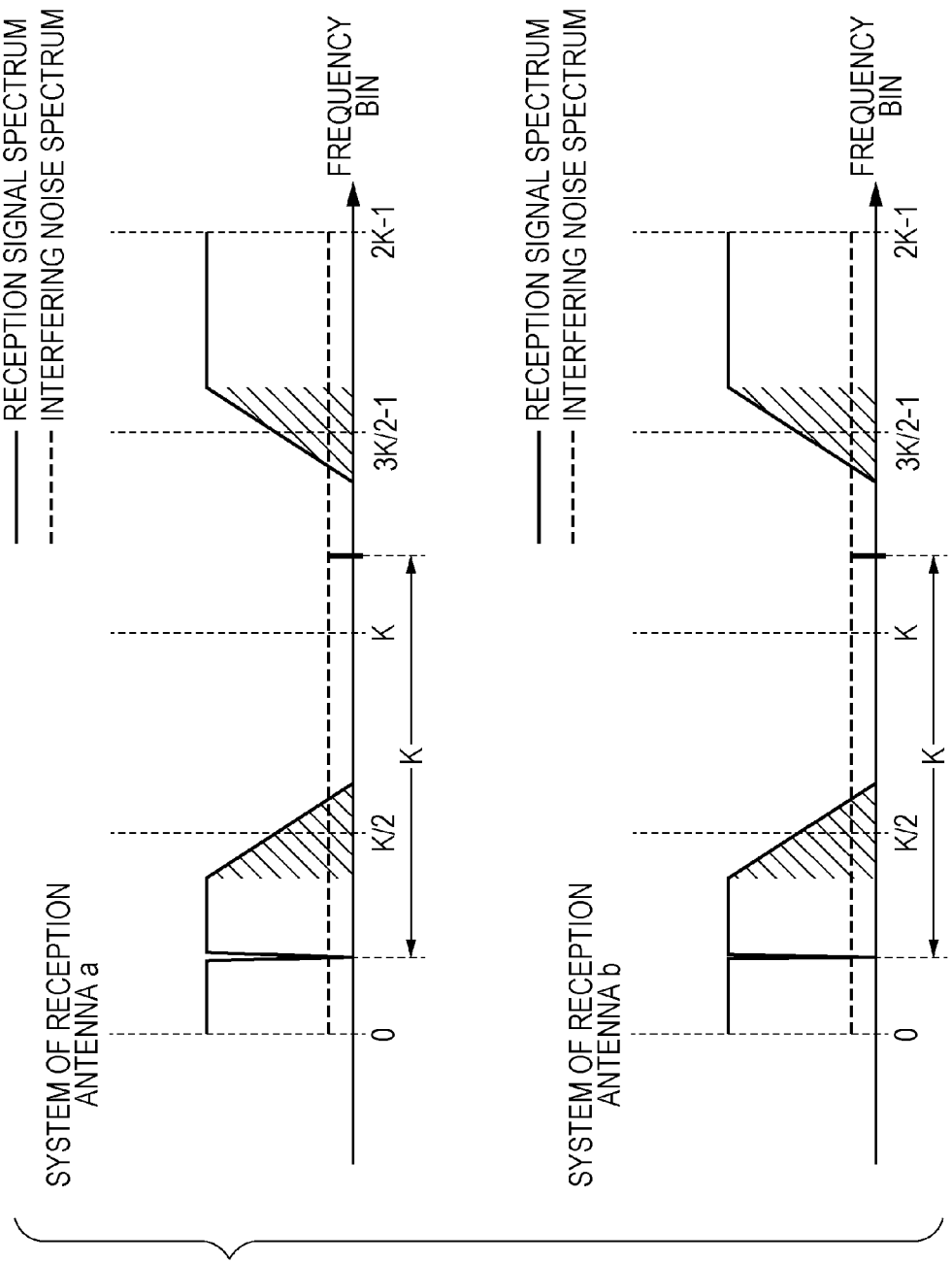
FIG. 9 is a diagram illustrating frequency response when a null point is produced on a received signal on one of the reception systems.
Figure 10:
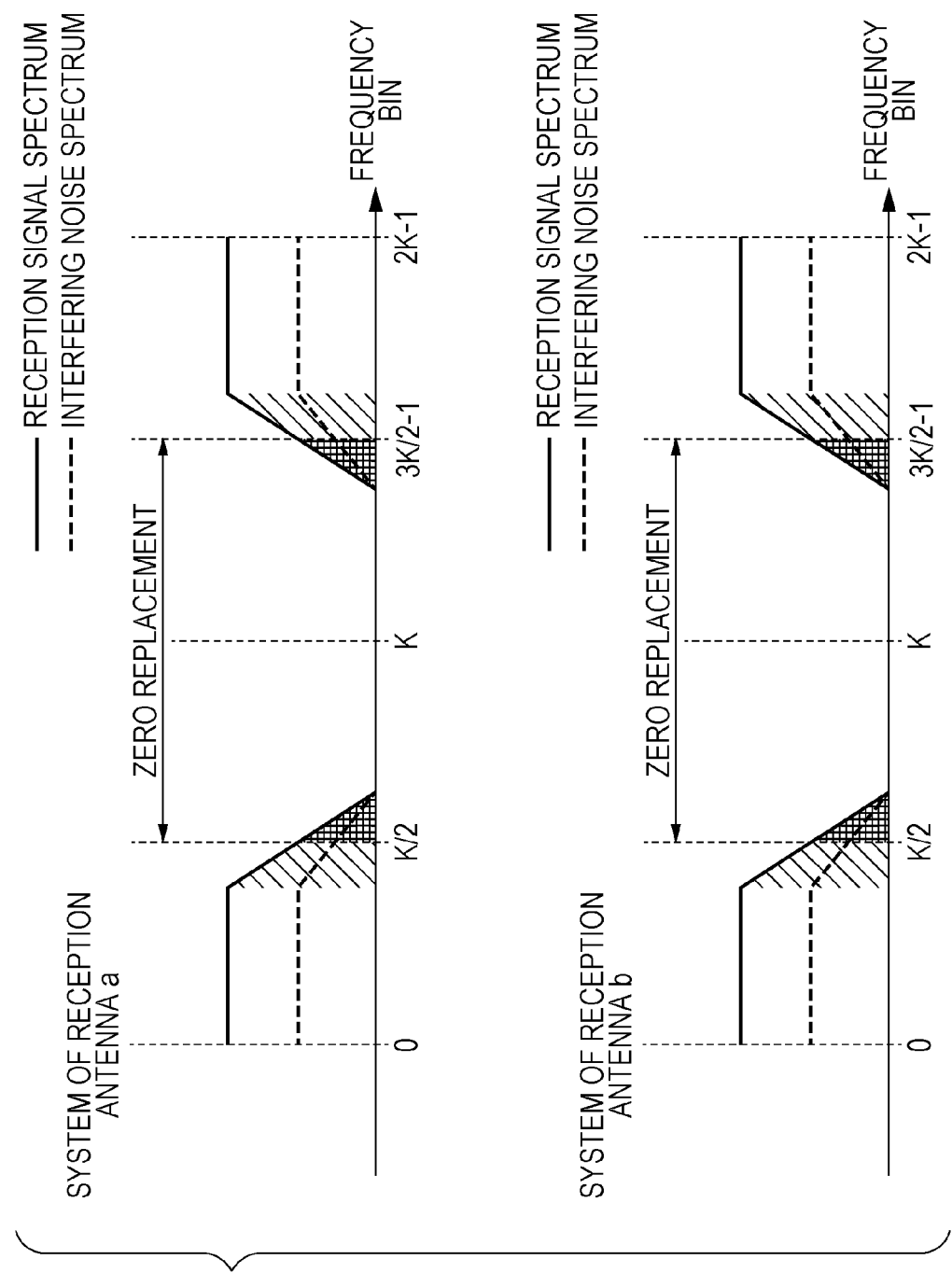
FIG. 10 is a diagram illustrating frequency response when received signal power on both reception systems is so high that co-channel interference is produced.
Figure 11:
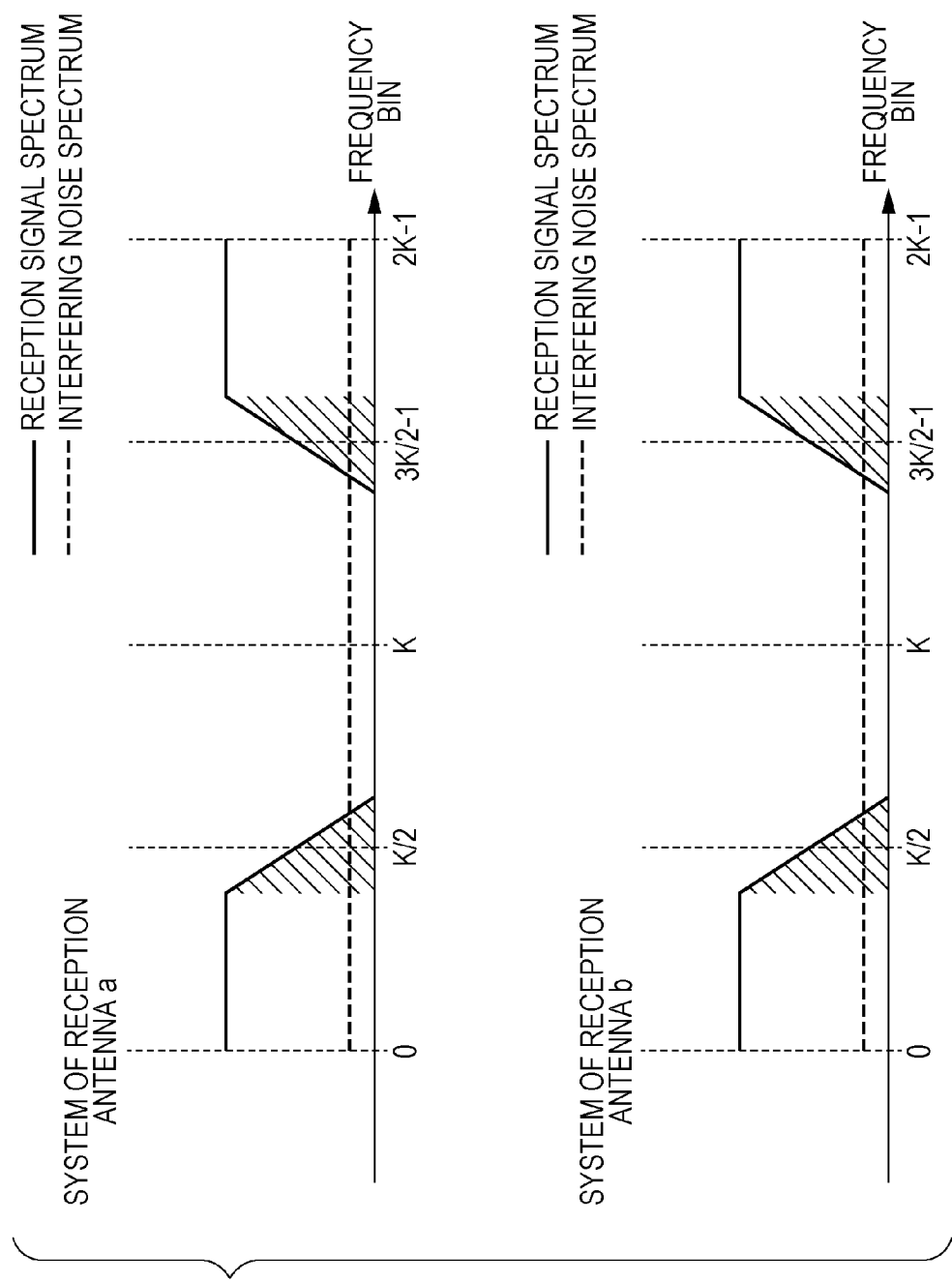
FIG. 11 is a diagram illustrating frequency response when received signal power on both reception systems is high, an interference level is low, and no interference is produced.

FIGS. 6 to 11 are diagrams illustrating frequency responses which indicate received signal power and noise/interference power on a plurality of receiving antenna systems in various conditions. FIG. 6 is a diagram illustrating a frequency response when adjacent channel interference is produced on one of the reception systems. FIG. 7 is a diagram illustrating a frequency response when received signal power is low on one of the reception systems. FIG. 8 is a diagram illustrating a frequency response when adjacent channel interference is produced on both reception systems. FIG. 9 is a diagram illustrating a frequency response when a null point is produced on a received signal on one of the reception system. FIG. 10 is a diagram illustrating a frequency response when received signal power is so high on both reception systems that co-channel interference is produced. FIG. 11 is a diagram illustrating a frequency response when received signal power on both reception systems is high, an interfering noise level is low, and thus no interference is produced.

When adjacent channel interference is produced on one of the reception systems, as illustrated in FIG. 6, a signal around the frequency of K/2 on the system of receiving antenna a, on which the interference influences significantly, is not selected. In this case, the selectors 120 and 130 select a signal around the frequency of K/2 on the system of receiving antenna b, a signal around the frequency of 3K/2−1 on the system of receiving antenna a, and a signal around the frequency of 3K/2−1 on the system of receiving antenna b.

Although an example in which the equalization coefficients are calculated by selecting a 3-vector signal is described in the first embodiment, a method in which a 2-vector is selected may also be employed. A signal selection criterion by which, as an example, signals are selected, based on quality of the received signals, in descending order from a signal with as good quality as possible, e.g. from a signal with a high SINR, may be employed. When interference is produced, signals are selected from signals with high SINRs and low interference levels.

When the received signal power on one of the reception systems is low as illustrated in FIG. 7, a 2-vector on the other system of receiving antenna a, on which the received signal power is high, is selected. In this case, the selectors 120 and 130 select a signal around the frequency of K/2 on the system of receiving antenna a and a signal around the frequency of 3K/2−1 on the system of receiving antenna a.

When adjacent channel interference is produced on both reception systems as illustrated in FIG. 8, no signal around the frequency of K/2 on both the system of receiving antenna a and the system of receiving antenna b, which are significantly influenced, is selected. In this case, the selectors 120 and 130 select a signal around the frequency of 3K/2−1 on the system of receiving antenna a and a signal around the frequency of 3K/2−1 on the system of receiving antenna b.

Although an example in which a 3-vector of equalization coefficients is calculated is described in the first embodiment, by combining SINRs and amounts of signal power $|H_a(k_L)|^2$, $|H_a(k_U)|^2$, $|H_b(k_L)|^2$, and $|H_b(k_U)|^2$ of each vector at each frequency bin, a vector with a low power among 3-vectors may be replaced with zero.

When a null point is produced on the received signals on one of the reception systems as illustrated in FIG. 9, use of signals on the system of receiving antenna a on which the null point is produced is avoided. For example, at a frequency bin at which a null point is produced, signals on the other system of receiving antenna b are selected.

As described above, in the first embodiment, signals are selected by using SINRs at individual frequency bins, and, when a null point is produced in a range defined by the formula (12) due to multipath communication or the rate α by the formula (11).

$$\frac{K}{2} \le k \le \frac{3}{2}K - 1 \tag{15}$$

Frequency bins $K_2$ and $K_4$, located in the range of systems are high and interfering noise is so low that no interference is detected as illustrated in FIG. 11, from among signals around the frequency of K/2 on the system of receiving antenna a, around the frequency of K/2 on the system of receiving antenna b, around the frequency of 3K/2−1 on the system of receiving antenna a, and around the frequency of 3K/2−1 on the system of receiving antenna b, two or three signals are selected in descending order of SINRs.

According to the above-described first embodiment, the selectors 120 and 130 select three or two signals and an equalization coefficients vector with three or less dimensions is calculated. With this configuration, it is possible to reduce an amount of operations of MMSE which is used by the 3-vector equalization coefficient calculator 140 and an amount of operations by the 3-vector frequency domain equalizer 150.

According to the first embodiment, because signals are selected based on an SINR at each frequency bin, when a null point is produced due to, for example, multipath communication, it becomes possible to avoid selection of a signal at the null point.

Second Embodiment

Figure 12:
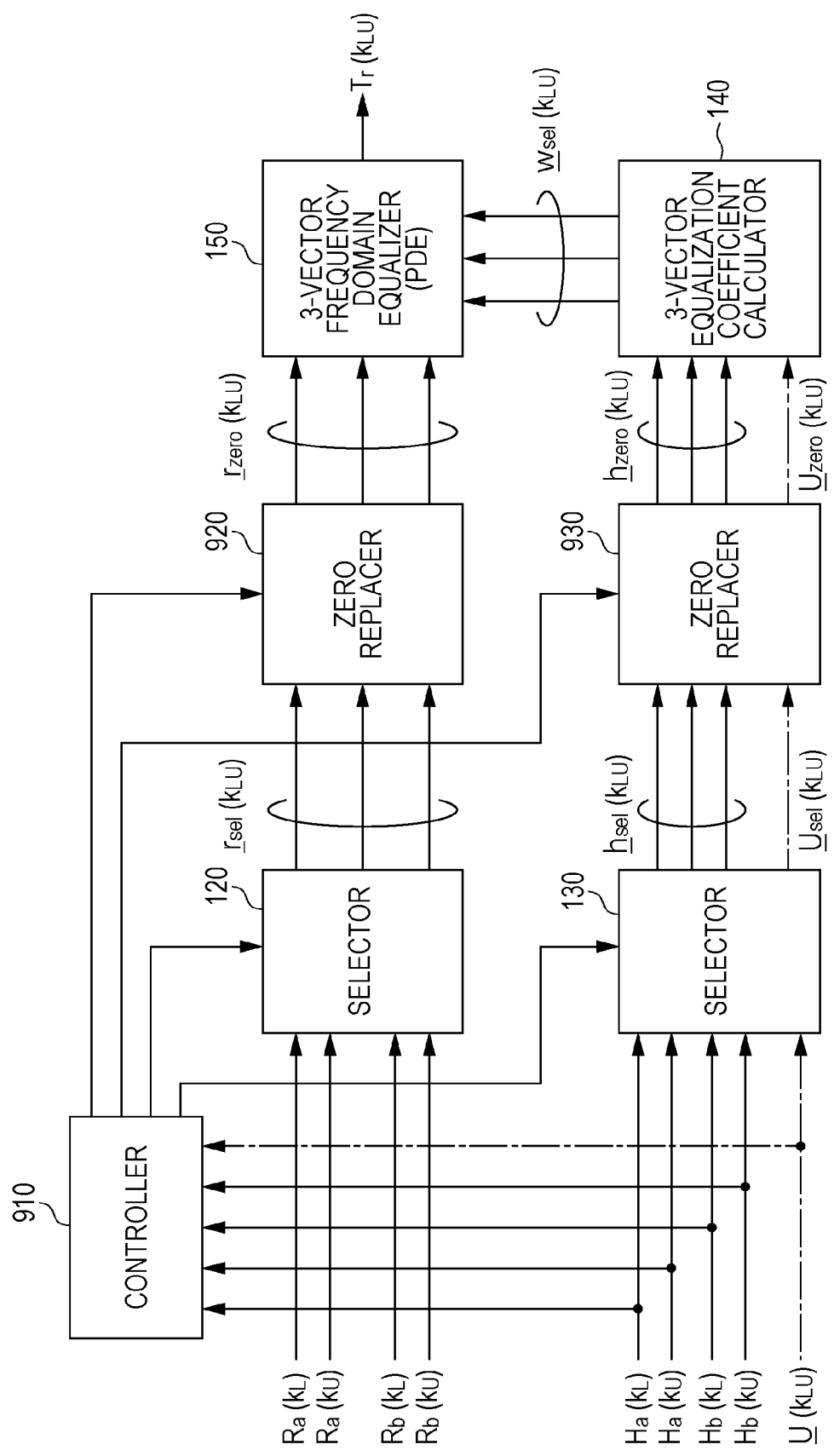
FIG. 12 is a diagram illustrating a configuration of an equalization coefficient calculator and equalizer usable in a receiver of a second embodiment of the present disclosure.

FIG. 12 is a diagram illustrating a configuration of an equalization coefficient calculator and equalizer which is used for a receiver in a second embodiment of the present disclosure. In the second embodiment, another configuration of the equalization coefficient calculator and equalizer of the receiver will be described. In FIG. 12, components that are the same as those in FIG. 1 are denoted by the same reference characters and description thereof will be omitted.

The equalization coefficient calculator and equalizer in the receiver includes a controller 910, selectors 120 and 130, zero replacers 920 and 930, a 3-vector equalization coefficient calculator 140, and a 3-vector frequency domain equalizer 150. In FIG. 12, solid arrows other than the signals output from the controller indicate complex numbers, each of which is an element of a vector or a matrix, and dashed arrows indicate matrices.

In FIG. 12, the controller 910, based on the channel $\underline{h}(k_{LU})$ and the undesired signal matrix $\underline{U}(k_{LU})$, calculates signal power values $|H_a(k_L)|^2$, $|H_a(k_U)|^2$, $|H_b(k_L)|^2$, and $|H_b(k_U)|^2$ of individual vectors at individual frequency bins, and selects diagonal elements of $\underline{U}(k_{LU})$, which indicates power values of undesired signals. Based on the signal power values and the diagonal elements, the controller 910 calculates ratios of signal power values to power values of undesired signals $SINR_a(k_L)$, $SINR_a(k_U)$, $SINR_b(k_L)$, and $SINR_b(k_U)$.

The selector 120, by following commands of control signals from the controller 910, selects three signals from the frequency domain received vector $\underline{r}(k_{LU})$, which is a 4-vector, in descending order of the calculated SINRs and generates a 3-vector $\underline{r}_{sel}(k_{LU})$.

The selector 130, by following commands of control signals from the controller 910, selects three signals from the channel $\underline{h}(k_{LU})$, which is a 4-vector, in descending order of the calculated SINRs and generates a 3-vector $\underline{h}_{sel}(k_{LU})$. The selector 130 also selects 3×3 signals from the 4×4 undesired signal matrix $\underline{U}(k_{LU})$ and generates $\underline{U}_{sel}(k_{LU})$.

The zero replacer 920, by following commands of control signals from the controller 910, replaces a portion of the received vector $\underline{r}_{sel}(k_{LU})$ with zeros. The zero replacer 930, by following commands of control signals from the controller 910, replaces individual portions of the channel $\underline{h}_{sel}(k_{LU})$ and the undesired signal matrix $\underline{U}_{sel}(k_{LU})$ with zeros. As an example, the zero replacers 920 and 930 replace complex numbers of elements corresponding to low signal power values $|H_a(k_L)|^2$, $|H_a(k_U)|^2$, $|H_b(k_L)|^2$, and $|H_b(k_U)|^2$ with zeros. The zero replacers 920 and 930 change $\underline{r}_{sel}(k_{LU})$ and $\underline{h}_{sel}(k_{LU})$, which are selected by the selectors 120 and 130, to $\underline{r}_{zero}(k_{LU})$ and $\underline{h}_{zero}(k_{LU})$, respectively.

For example, $\underline{r}_{sel}(k_{LU})$ is expressed by the formula (13), and, when the signal power on the system of receiving antenna b is low, $\underline{r}_{zero}(k_{LU})$ is expressed by the formula (14).

$$\underline{r}_{sel}(k_{LU}) = [R_a(k_L)\ R_b(k_L)\ R_b(k_U)]^T \tag{13}$$

$$\underline{r}_{zero}(k_{LU}) = [R_a(k_L)\ 0\ R_b(k_U)]^T \tag{14}$$

In a similar manner, terms of $\underline{h}_{sel}(k_{LU})$ and $\underline{U}_{sel}(k_{LU})$ corresponding to $H_b(k_L)$ are replaced with zeros.

With this processing by the zero replacers 920 and 930, it becomes possible for the 3-vector equalization coefficient calculator 140 and the 3-vector frequency domain equalizer 150 to carry out virtually 2-vector processing.

When the received signal power on both reception systems is so high that co-channel interference takes place as illustrated in FIG. 10, the zero replacement is carried out in a range expressed by the formula (15).

$$0 \le k \le K - \alpha\frac{K}{2} \tag{12}$$
$$\frac{3}{2}K + \alpha\frac{K}{2} - 1 \le k \le 2K - 1$$

In the second embodiment, by the zero replacers 920 and 930 carrying out zero replacement when co-channel interference takes place or the like, it is possible to further reduce an amount of operations of MMSE, which is used by the 3-vector equalization coefficient calculator 140, and an amount of operations by the 3-vector frequency domain equalizer 150.

Third Embodiment

Figure 13:
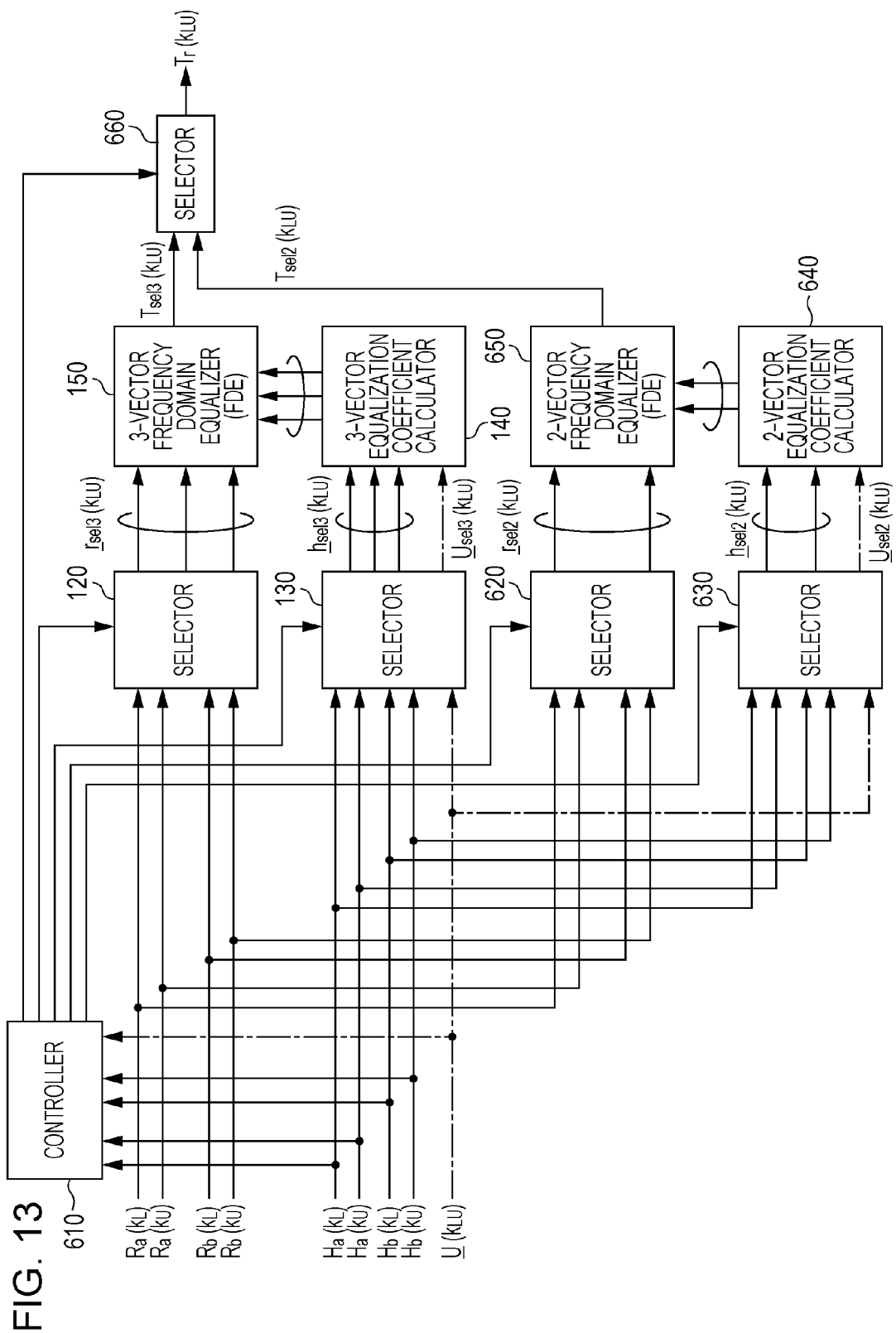
FIG. 13 is a diagram illustrating a configuration of an equalization coefficient calculator and equalizer usable in a receiver of a third embodiment of the present disclosure.

FIG. 13 is a diagram illustrating a configuration of an equalization coefficient calculator and equalizer which is used in a receiver of a third embodiment of the present disclosure. In the third embodiment, still another configuration of the equalization coefficient calculator and equalizer in the receiver will be described. In FIG. 13, components that are the same as those in FIG. 1 are denoted by the same reference characters and description thereof will be omitted.

The equalization coefficient calculator and equalizer in the receiver includes a controller 610, selectors 120, 130, 620, and 630, a 3-vector equalization coefficient calculator 140, a 3-vector frequency domain equalizer 150, a 2-vector equalization coefficient calculator 640, a 2-vector frequency domain equalizer 650, and a selector 660. In FIG. 13, solid arrows other than the signals output from the controller indicate complex numbers, each of which is an element of a vector or a matrix, and dashed arrows indicate matrices.

In FIG. 13, the controller 610, based on the channel $\underline{h}(k_{LU})$ and the undesired signal matrix $\underline{U}(k_{LU})$, calculates signal power values $|H_a(k_L)|^2$, $|H_a(k_U)|^2$, $|H_b(k_L)|^2$, and $|H_b(k_U)|^2$ of individual vectors at individual frequency bins, and selects diagonal elements of $\underline{U}(k_{LU})$, which indicate the power values of undesired signals. Based on the signal power values and the diagonal elements, the controller 610 calculates ratios of the signal power values to power values of undesired signals $SINR_a(k_L)$, $SINR_a(k_U)$, $SINR_b(k_L)$, and $SINR_b(k_U)$.

The selector 120, by following commands of control signals from the controller 610, selects three signals from the frequency domain received vector $\underline{r}(k_{LU})$, which is a 4-vector, in descending order of the calculated SINRs and generates a 3-vector $\underline{r}_{sel3}(k_{LU})$.

The selector 130, by following commands of control signals from the controller 610, selects three signals from the channel vector $\underline{h}(k_{LU})$, which is a 4-vector, in descending order of the calculated SINRs and generates 3-vector $\underline{h}_{sel3}(k_{LU})$. The selector 130 also selects 3×3 signals from the 4×4 undesired signal matrix $\underline{U}(k_{LU})$ to generate $\underline{U}_{sel3}(k_{LU})$.

With the above-described processing, as with the first embodiment, it becomes possible for the 3-vector equalization coefficient calculator 140 and the 3-vector frequency domain equalizer 150 to carry out processing by 3-vector operations.

The selector 620, by following commands of control signals from the controller 610, selects a predefined number of signals from the frequency domain received vector $\underline{r}(k_{LU})$ based on quality of the received signals. As an example, the selector 620 selects two signals from the frequency domain received vector $\underline{r}(k_{LU})$, which is a 4-vector, in descending order of the calculated SINRs to generate a 2-vector $\underline{r}_{sel2}(k_{LU})$.

The selector 630, by following commands of control signals from the controller 610, selects a predefined number of signals from the channel $\underline{h}(k_{LU})$ as a channel vector based on quality of the received signals. As an example, the selector 630 selects two signals from the channel $\underline{h}(k_{LU})$, which is a 4-vector, in descending order of the calculated SINRs to generate a 2-vector $\underline{h}_{sel2}(k_{LU})$. The selector 630, by following commands of control signals from the controller 610, also selects a predefined number of signals from the undesired signal matrix $\underline{U}(k_{LU})$ as a noise/interference matrix based on quality of the received signals. As an example, the selector 630 selects 2×2 signals from the 4×4 undesired signal matrix $\underline{U}(k_{LU})$ to generate $\underline{U}_{sel2}(k_{LU})$.

With the above-described processing, it becomes possible for the 2-vector equalization coefficient calculator 640 and the 2-vector frequency domain equalizer 650 to carry out processing by 2-vector operations.

An output of the 3-vector frequency domain equalizer 150 is denoted by $T_{sel3}(k_{LU})$, and an output of the 2-vector frequency domain equalizer 650 is denoted by $T_{sel2}(k_{LU})$.

The selector 660, by following commands of control signals from the controller 610, selects either of $T_{sel3}(k_{LU})$ or $T_{sel2}(k_{LU})$ based on a predefined selection criterion and outputs the selection as $T_r(k_{LU})$. The output selection criterion is changeable by setting. As an example of the selection criterion, when SINRs of two signals with the best quality and the second best quality are sufficiently high based on quality of the received signals, $T_{sel2}(k_{LU})$ is selected. For example, in a range where frequency response of the received signal power forms a flat shape, it is possible to carry out equalization by 2-vector operations.

According to the third embodiment, the selectors 120 and 130 selecting three signals makes it possible to reduce an amount of operations of MMSE, which is used by the 3-vector equalization coefficient calculator 140, and an amount of operations of the 3-vector frequency domain equalizer 150.

The selectors 620 and 630 select two signals, the 2-vector equalization coefficient calculator 640 calculates equalization coefficients, and the 2-vector frequency domain equalizer 650 carries out equalization. When the SINRs of two signals with the best quality and the second best quality are sufficiently high, it is possible to carry out calculation of equalization coefficients and equalization by 2-vector operations. Accordingly, at frequency bins where 2-vector operations do not influence performance, it is possible to further reduce an amount of operations compared with 3-vector operations.

Fourth Embodiment

Figure 14:
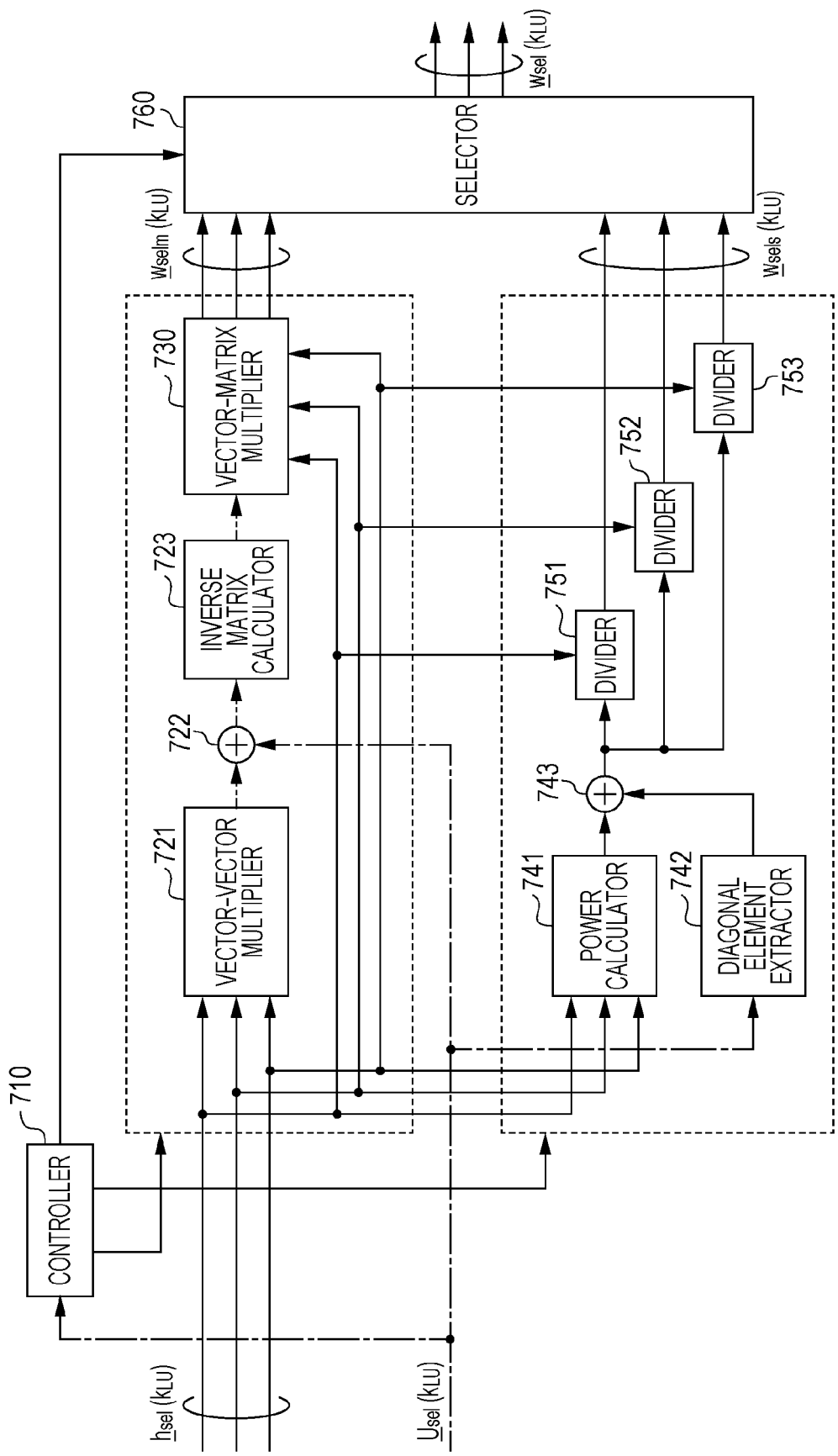
FIG. 14 is a diagram illustrating a configuration of an equalization coefficient calculator usable in a receiver of a fourth embodiment of the present disclosure.

FIG. 14 is a diagram illustrating a configuration of an equalization coefficient calculator usable in a receiver of a fourth embodiment of the present disclosure. In the fourth embodiment, another configuration of the 3-vector equalization coefficient calculator usable in the equalization coefficient calculators and equalizers which were described in the first to third embodiments.

The 3-vector equalization coefficient calculator includes a controller 710, a vector-vector multiplier 721, a matrix adder 722, an inverse matrix calculator 723, a vector-matrix multiplier 730, a power calculator 741, a diagonal element extractor 742, a scalar adder 743, dividers 751, 752, and 753, and a selector 760. In FIG. 14, solid arrows other than the signals output from the controller indicate complex numbers, each of which is an element of a vector or a matrix, and dashed arrows indicate matrices.

The vector-vector multiplier 721, the matrix adder 722, the inverse matrix calculator 723, and the vector-matrix multiplier 730 function as an MMSE calculator in matrix operation processing. The power calculator 741, the diagonal element extractor 742, the scalar adder 743, and the dividers 751 to 753 function as an MMSE calculator in scalar operation processing.

A signal $\underline{h}_{sel}(k_{LU})$, which is a 3-vector channel selected by the selector 130, is expressed by the formula (16).

$$\underline{h}_{sel}(k_{LU}) = [H_a(k_L)\ H_a(k_U)\ H_b(k_L)]^T \quad (16)$$

A 3-vector signal $\underline{U}_{sel}(k_{LU})$, which is an undesired signal matrix selected by the selector 130, is expressed by formula (17).

$$\underline{U}_{sel}(k_{LU}) = \begin{bmatrix} u_a(k_L) \cdot u_a^*(k_L) & u_a(k_L) \cdot u_a^*(k_U) & u_a(k_L) \cdot u_b^*(k_L) \\ u_a(k_U) \cdot u_a^*(k_L) & u_a(k_U) \cdot u_a^*(k_U) & u_a(k_U) \cdot u_b^*(k_L) \\ u_b(k_L) \cdot u_a^*(k_L) & u_b(k_L) \cdot u_a^*(k_U) & u_b(k_L) \cdot u_b^*(k_L) \end{bmatrix} \quad (17)$$

In this case, it is possible to calculate equalization coefficients $\underline{w}_{selm}(k_{LU})$ based on MMSE by the formula (18).

$$\underline{w}_{selm}(k_{LU}) = \underline{h}^H_{sel}(k_{LU}) \cdot [\underline{h}_{sel}(k_{LU}) \cdot \underline{h}^H_{sel}(k_{LU}) + \underline{U}_{sel}(k_{LU})]^{-1} \quad (18)$$

In the formula (18), the inverse matrix term is calculated through processing by the vector-vector multiplier 721, the matrix adder 722, and the inverse matrix calculator 723.

The vector-matrix multiplier 730 multiplies the inverse matrix calculated in the above-described processing by the selected $\underline{h}_{sel}(k_{LU})$ to obtain the equalization coefficient $\underline{w}_{selm}(k_{LU})$.

When there is no correlation between antennas, it is possible to express $\underline{U}_{sel}(k_{LU})$ in the formula (17) by the formula (19).

$$\underline{U}_{sel}(k_{LU}) = \begin{bmatrix} u_a(k_L) \cdot u_a^*(k_L) & 0 & 0 \\ 0 & u_a(k_U) \cdot u_a^*(k_U) & 0 \\ 0 & 0 & u_b(k_L) \cdot u_b^*(k_L) \end{bmatrix} \quad (19)$$

In the formula (19), a diagonal element indicates undesired signal power at each frequency bin, and, when there is no correlation between frequency bins, $\underline{U}_{sel}(k_{LU})$ is also expressed by the formula (20).

$$\underline{U}_{sel}(k_{LU}) = NO^2(k_{LU}) \begin{bmatrix} 1 & 0 & 0 \\ 0 & 1 & 0 \\ 0 & 0 & 1 \end{bmatrix} \quad (20)$$
$$= NO^2(k_{LU})I$$

where $NO^2(k_{LU})$ denotes noise power existing between antennas and frequencies without correlation, and I denotes an identity matrix.

The equalization coefficient $\underline{w}_{sels}(k_{LU})$ based on MMSE is expressed by the formula (21).

$$\underline{w}_{sets}(k_{LU}) = \underline{h}^H_{sel}(k_{LU}) \cdot [\underline{h}_{sel}(k_{LU}) \cdot \underline{h}^H_{sel}(k_{LU}) + \underline{U}_{sel}(k_{LU})]^{-1} \quad (21)$$
$$= \underline{h}^H_{sel}(k_{LU}) \cdot [\underline{h}_{sel}(k_{LU}) \cdot \underline{h}^H_{sel}(k_{LU}) + NO^2(k_{LU})I]^{-1}$$
$$= [I + \underline{h}^H_{sel}(k_{LU}) \cdot [NO^2(k_{LU})I]^{-1} \cdot \underline{h}_{sel}(k_{LU})]^{-1} \cdot$$
$$\underline{h}^H_{sel}(k_{LU}) \cdot [NO^2(k_{LU})I]^{-1}$$
$$= [I + NO^{-2}(k_{LU}) \cdot \underline{h}^H_{sel}(k_{LU} \cdot \underline{h}_{sel}(k_{LU})]^{-1} \cdot$$
$$\underline{h}^H_{sel}(k_{LU}) \cdot [NO^2(k_{LU})I]^{-1}$$
$$= [no^2 \cdot (I + NO^{-2}(k_{LU}) \cdot \underline{h}^H_{sel}(k_{LU}) \cdot$$
$$\underline{h}_{sel}(k_{LU}))]^{-1} \cdot \underline{h}^H_{sel}(k_{LU})$$
$$= \underline{h}^H_{sel}(k_{LU}) \cdot [\underline{h}^H_{sel}(k_{LU}) \cdot \underline{h}_{sel}(k_{LU}) + NO^2(k_{LU})I]^{-1}$$

The inverse matrix term in the formula (21) may be expressed by a scalar which indicates power, not a matrix, as by the formula (22).

$$\underline{h}^H_{sel}(k_{LU}) \cdot \underline{h}_{sel}(k_{LU}) + NO^2 I(k_{LU}) =$$
$$|H_a(k_L)|^2 + |H_a(k_U)|^2 + |H_b(k_L)|^2 + NO^2(k_{LU}) \quad (22)$$

The inverse matrix term expressed by the formula (22) is calculated through processing by the power calculator 741, the diagonal element extractor 742, and the scalar adder 743. The diagonal element extractor 742 extracts an element in diagonal elements or calculates a mean value of the diagonal elements. The equalization coefficient $\underline{w}_{sels}(k_{LU})$ is obtained by the dividers 751, 752, and 753 dividing the selected $\underline{h}_{sel}(k_{LU})$ by the scalar representing the inverse matrix, which is obtained through the above-described processing.

The controller 710, based on quality of the received signals, calculates the equalization coefficient by switching two MMSE calculators, a calculator carrying out matrix operation processing and a calculator carrying out scalar operation processing. As an example, the controller 710 decides whether or not correlations between antennas and between frequency bins exist and controls each block so as to make either of the processing systems operate. For example, when there is no interference in the received signal but a noise is added to the received signal, correlations between antennas and between frequency bins are small.

When the controller 710 decides that there is neither correlation between antennas nor correlation between frequencies (the correlation values are less than predefined values), the controller 710 calculates the equalization coefficient $\underline{w}_{sels}(k_{LU})$ by making the power calculator 741, the diagonal element extractor 742, the scalar adder 743, and the dividers 751 to 753 carry out scalar operation processing. When the controller 710 decides that there is a correlation either between antennas or between frequencies (either of the correlation values is equal to or greater than the predefined value), the controller 710 calculates the equalization coefficient $\underline{w}_{selm}(k_{LU})$ by making the vector-vector multiplier 721, the matrix adder 722, the inverse matrix calculator 723, and the vector-matrix multiplier 730 carry out matrix operation processing. The controller 710 makes the selector 760 select an equalization coefficient and outputs $\underline{w}_{sel}(k_{LU})$.

In the fourth embodiment, although a configuration example in a case of 3-vectors is described as an example of the equalization coefficient calculator, because the configuration does not depend on the number of vectors, the configuration may also be applied to cases of 2-vectors and 4-vectors.

According to the fourth embodiment, because the controller 710 can select an equalization coefficient calculation method with a low amount of MMSE calculation, it is possible to reduce the amount of operations.

Fifth Embodiment

A fifth embodiment is a variation of the equalization coefficient calculator and equalizer of the third embodiment illustrated in FIG. 13. In the fifth embodiment, an equalization coefficient calculator with a lower amount of operations is selected on the 2-vector equalization coefficient calculator 640 of the third embodiment, in accordance with the existence of a correlation between antennas or between frequency bins, as with the fourth embodiment. For example, when the correlation between antennas or between frequency bins is small, it is possible to carry out equalization by selecting an equalization coefficient calculator with a lower amount of operations because there is no interference in the received signal. With this configuration, the amount of operations may be further reduced.

Sixth Embodiment

A sixth embodiment is a variation of the equalization coefficient calculator and equalizer of the first embodiment illustrated in FIG. 1. In the first embodiment, because the 3-vector equalization coefficient calculator 140 is used, inverse matrix operation needs to be carried out when interference resistance is required. On the other hand, when there is no interference, as described in the fourth embodiment, the 3-vector equalization coefficient calculator can carry out the scalar operation expressed by the formulae (21) and (22). Therefore, in the sixth embodiment, an equalization coefficient calculator with a lower amount of operations is selected on the 3-vector equalization coefficient calculator 140 of the first embodiment, in accordance with the existence of a correlation between antennas or between frequency bins, as with the fourth embodiment.

The amount of operations necessary for the equalization coefficient calculation through scalar operations for 4-vectors is less than the amount for the calculation through 3×3 or 2×2 inverse matrix operations, and lower power is consumed for the calculation thorough scalar operations. In other words, though depending on a trade-off between interference resistance and SINR, it is possible to reduce the amount of operations by switching 3×3 or 2×2 inverse matrix operations and scalar operations of 4-vectors.

Seventh Embodiment

A seventh embodiment is a variation of the selectors 120 and 130 of the first embodiment illustrated in FIG. 1 and the selectors 620 and 630 of the third embodiment illustrated in FIG. 13. The afore-mentioned selectors 120, 130, 620, and 630 carry out selection based on SINRs at individual frequency bins. In the seventh embodiment, a selector, based on a mean value of SINRs at individual frequency bins in each predefined range of frequency bins, carries out selection for each of the ranges of frequency bins. In other words, the equalizer carries out selection of a signal based on a mean value of quality for each predefined range of frequency bins, and carries out equalization with a small amount of operations. With this configuration, in an operation circuit, the number of switching operations to switch signals may be reduced compared with a case of carrying out control for each frequency bin, which leads to a reduction in power consumption.

Eighth Embodiment

An eighth embodiment is a variation of the controller 110 of the first embodiment illustrated in FIG. 1, the controller 910 of the second embodiment illustrated in FIG. 12, and the controller 610 of the third embodiment illustrated in FIG. 13. The afore-mentioned controller 110, 610, and 910 control each selector based on an SINR at each frequency bin of a received signal. In the eighth embodiment, a controller makes a decision by using not only an SINR but also an amount of power of a received signal and carries out control in accordance with the SINR and the received signal power.

For example, not only a case in which the signal power S is 1.0 and the power of interference and noise I+N is 0.1 but also a case in which the signal power S is 0.1 and the power of interference and noise I+N is 0.01 may be included in cases in which the SINR is 10. In the case in which the power S is 0.1 and the power I+N is 0.01, because the signal power S is sufficiently low, it is possible to carry out processing in which no signal is selected or the signal is replaced with zero. Carrying out control by taking into consideration the received signal power as described above makes it possible to reduce an amount of operations.

Ninth Embodiment

A ninth embodiment is exemplified by a case in which a lot of receiving antenna systems are used. In the first to third embodiments, cases in which there are two receiving antenna systems, and a complex baseband signal is sampled at twice the symbol rate by ADCs 212*a* and 212*b* were described. In the ninth embodiment, a case in which there are M receiving antenna systems, and a complex baseband signal, which is received by the M systems of antenna, is sampled at C-times the symbol rate will be described.

Even though the received signal is sampled at C-times the symbol rate by the ADCs, valid signal components, due to a transmission filter and a reception filter, exist within a range of signals sampled at twice the symbol rate. Therefore, as with the first to third embodiments, even in a case of C>2, the number of elements of a channel vector required for the calculation of an equalization coefficient becomes 2M. A noise/interference matrix becomes a (2M)×(2M) matrix.

2M−1 or less signals are selected as elements of the channel vector, (2M−1)×(2M−1) or less signals are selected as elements of the noise/interference matrix, and, based on the selected channel vector and noise/interference matrix, 2M−1 or less equalization coefficient vector is calculated.

Accordingly, when the ninth embodiment is applied to the first and second embodiments, it is possible to carry out equalization by 2M−1 vector operations. When the ninth embodiment is applied to the third embodiment, the equalization is carried out by switching an equalization by 2M−1 vector operations and an equalization by 2M−2 vector operations.

According to the ninth embodiment, it is possible to carry out equalization with 2M−1 or less vector operations and to reduce an amount of operations.

As described above, according to the embodiments, in the equalization on a receiver having multiple antenna systems, when the equalization is carried out by combining different antenna systems and frequency signals, it is possible to reduce an amount of operations required for the equalization by selecting a frequency signal based on an SINR or the like. Therefore, it is possible to carry out equalization the circuit implementation of which is easy and the power consumption of which is low.

Summary of an Aspect of the Disclosure

Various aspects of the embodiments according to the present disclosure include the followings.

An equalization method of the present disclosure includes, in a receiver having multiple antennas, carrying out frequency domain conversion of M received signals, which are received by the plurality of antennas, into a 2M received vector, which includes 2M elements, carrying out channel estimation and noise/interference estimation based on the 2M received vector, calculating a 2M channel vector and a (2M)×(2M) noise/interference matrix, selecting a 2M−1 or less channel vector from the calculated 2M channel vector and selecting a (2M−1)×(2M−1) or less noise/interference matrix from the calculated (2M)×(2M) noise/interference matrix, based on quality of the received signals, calculating 2M−1 or less equalization coefficient vector based on the 2M−1 or less channel vector and the (2M−1)×(2M−1) noise/interference matrix, selecting a 2M−1 or less received vector from the 2M received vector, and equalizing the 2M−1 or less received vector by using the equalization coefficient.

An equalization method of the present disclosure includes, in a receiver having multiple antennas, carrying out frequency domain conversion of M received signals, which are received by the plurality of antennas, into a 2M received vector, which includes 2M elements, carrying out channel estimation and noise/interference estimation based on the 2M received vector, calculating a 2M channel vector and a (2M)×(2M) noise/interference matrix, selecting a 2M−1 or less channel vector from the calculated 2M channel vector and selecting a (2M−1)×(2M−1) or less noise/interference matrix from the calculated (2M)×(2M) noise/interference matrix, based on quality of the received signals, replacing a portion of the 2M−1 channel vector with zeros, replacing a portion of the (2M−1)×(2M−1) or less noise/interference matrix with zeros, calculating a 2M−1 or less equalization coefficient vector as equalization coefficients based on both the channel vector, the portion of which is replaced with zeros, and the noise/interference matrix, the portion of which is replaced with zeros, selecting a 2M−1 or less received vector from the 2M received vector, replacing a portion of the 2M−1 received vector with zeros, and equalizing the 2M−1 or less received vector, the portion of which is replaced with zeros based on the equalization coefficient.

An equalization method of the present disclosure includes, in a receiver having multiple antennas, carrying out frequency domain conversion of M received signals, which are received by the plurality of antennas, into a 2M received vectors, which includes 2M elements, carrying out channel estimation and noise/interference estimation based on the 2M received vector, and calculating a 2M channel vector and a (2M)×(2M) noise/interference matrix, includes a first method including selecting a 2M−1 or less channel vector from the calculated 2M channel vector and selecting a (2M−1)×(2M−1) or less noise/interference matrix from the calculated (2M)×(2M) noise/interference matrix, based on quality of the received signals, calculating a 2M−1 or less equalization coefficient vector as first equalization coefficients based on the 2M−1 or less channel vector and the (2M−1)×(2M31 1) or less noise/interference matrix, selecting a 2M−1 or less received vector from the 2M received vector, and equalizing the 2M−1 or less received vector based on the first equalization coefficients, and a second method including selecting a 2M−2 or less channel vector from the calculated 2M channel vector and selecting a (2M−2)×(2M−2) or less noise/interference matrix from the calculated (2M)×(2M) noise/interference matrix, based on quality of the received signals, calculating a 2M−2 or less equalization coefficient vector as second equalization coefficients based on the 2M−2 or less channel vector and the (2M−2)×(2M−2) or less noise/interference matrix, selecting a 2M−2 or less received vector from the 2M received vector, and equalizing the 2M−2 or less received vector based on the second equalization coefficients, and in accordance with a predefined criterion, switches the first method and the second method.

Any one of the above-described equalization methods may, calculates the equalization coefficient based on an MMSE by using one of matrix operation processing and scalar operation processing, which are switched based on quality of the received signal.

Any one of the above-described equalization methods may select the received vector, the channel vector, or the noise/interference matrix by using any one of the following selection methods:

(1) selection for each frequency bin based on SINRs of respective frequencies of the respective received signals;
(2) selection for each frequency bin based on SINRs and received signal powers of respective frequencies of the respective received signals;
(3) based on a mean value of SINRs in a predefined range of frequency bins of the respective received signals, selection for each of the predefined ranges of frequency bins;
(4) based on a mean values of SINRs and a mean value of received signal powers in a predefined range of frequency bins of the respective received signals, selection for each of the predefined ranges of frequency bins; and
(5) switching between selection for each frequency bin based on SINRs of respective frequencies of the respective received signals and, based on a mean value of SINRs in a predefined range of frequency bins of the respective received signals, selection for each of the predefined ranges of frequency bins.

An equalizer of the present disclosure includes a frequency domain converter which carries out frequency domain conversion of M systems of received signals, which are received by multiple antennas, into a 2M received vector, which includes 2M elements, a channel and noise/interference estimator which carries out channel estimation and noise/interference estimation based on the 2M received vector to calculate a 2M channel vector and a (2M)×(2M) noise/interference matrix, a first selector which selects a 2M−1 or less channel vector from the calculated 2M channel vector and selects a (2M−1)×(2M−1) or less noise/interference matrix from the calculated (2M)×(2M) noise/interference matrix, based on quality of the received signals, an equalization coefficient calculator which calculates a 2M−1 or less equalization coefficient vector as equalization coefficients based on the 2M−1 or less channel vector and the (2M−1)×(2M−1) or less noise/interference matrix, a second selector which selects a 2M−1 or less received vector from the 2M received vector, and a frequency domain equalizer which equalizes the 2M−1 or less received vector by using the equalization coefficients.

An equalizer of the present disclosure includes a frequency domain converter which carries out frequency domain conversion of M received signals, which are received by multiple antennas, into a 2M received vector, which includes 2M elements, a channel and noise/interference estimator which carries out channel estimation and noise/interference estimation based on the 2M received vector to calculate a 2M channel vector and a (2M)×(2M) noise/interference matrix, a first selector which selects a 2M−1 or less channel vector from the calculated 2M channel vector and selects a (2M−1)×(2M−1) or less noise/interference matrix from the calculated (2M)×(2M) noise/interference matrix, based on quality of the received signals, a first zero replacer which replaces a portion of the 2M−1 or less channel vector and a portion of the (2M−1)×(2M−1) or less noise/interference matrix with zeros, an equalization coefficient calculator which calculates a 2M−1 or less equalization coefficient vector as equalization coefficients based on both the 2M−1 or less channel vector, the portion of which is replaced with zeros, and the (2M−1)×(2M−1) or less noise/interference matrix, the portion of which is replaced with zeros, a second selector which selects a 2M−1 or less received vector from the 2M received vector, a second zero replacer which replaces a portion of the 2M−1 or less received vector with zeros, and a frequency domain equalizer which equalizes the 2M−1 or less received vector, the portion of which is replaced with zeros, by using the equalization coefficients.

An equalizer of the present disclosure includes a frequency domain converter which carries out frequency domain conversion of M received signals, which are received by multiple antennas, into a 2M received vector, which includes 2M elements, a channel and noise/interference estimator which carries out channel estimation and noise/interference estimation based on the 2M received vector to calculate a 2M channel vector and a (2M)×(2M) noise/interference matrix, a first equalization processing unit including a first selector which selects a 2M−1 or less channel vector from the calculated 2M channel vector and selects a (2M−1)×(2M−1) or less noise/interference matrix from the calculated (2M)×(2M) noise/interference matrix, based on quality of the received signals, a first equalization coefficient calculator which calculates a 2M−1 or less equalization coefficient vector as first equalization coefficients based on the 2M−1 or less channel vector and the (2M−1)×(2M−1) or less noise/interference matrix, a second selector which selects a 2M−1 or less received vector from the 2M received vector, and a first frequency domain equalizer which equalizes the 2M−1 or less received vector by using the first equalization coefficients, a second equalization processing unit including a third selector which selects a 2M−2 or less channel vector from the calculated 2M channel vector and selects a (2M−2)×(2M−2) or less noise/interference matrix from the calculated (2M)×(2M) noise/interference matrix, based on quality of the received signals, a second equalization coefficient calculator which calculates a 2M−2 or less equalization coefficient vector as second equalization coefficients based on the 2M−2 or less channel vector and the (2M−2)×(2M−2) or less noise/interference matrix, a fourth selector which selects a 2M−2 or less received vector from the 2M received vector, and a second frequency domain equalizer which equalizes the 2M−2 or less received vector by using the second equalization coefficients, and a controller which switches the first equalization processing unit and the second equalization processing unit.

Although various embodiments have been described with reference to drawings, it is indisputable that the present disclosure is not limited to such embodiments. It is apparent that those skilled in the art can devise numerous other variations and modifications within the scope of the foregoing disclosure, and it should be understood that such variations and modifications naturally belong to the scope of the disclosure. Components in the above-described embodiments may be combined in any manner without departing from the scope of the disclosure.

Although, in the above embodiments, the present disclosure was described by using a case in which the present disclosure is configured with hardware as an example, it is also possible to implement the present disclosure by software in cooperation with hardware.

Each functional block, used in the description of each of the above-described embodiments, is typically implemented by LSIs, which are integrated circuits. The functional blocks may be individually integrated into a single chip or may be collectively integrated into a single chip with a portion or the whole of every functional block. Although an integrated circuit is referred to as an LSI above, an integrated circuit may also be referred to as an IC, system LSI, super LSI, or ultra LSI in accordance with a degree of integration.

A method of integrated circuit implementation is not limited to developing an LSI, and the functional blocks may be implemented by a dedicated circuit or a general-purpose processor. A field programmable gate array (FPGA), which is programmable after an LSI is fabricated, or a re-configurable processor, which makes it possible to reconfigure connections and setting of circuit cells in an LSI, may also be used.

Furthermore, if a technology of integrated circuit implementation which substitutes for an LSI emerges due to progress of the semiconductor technology or derivation of new technologies, it goes without saying that integrated circuit implementation of the functional blocks may be accomplished by using the new technologies. Application of biotechnology or the like may be a possible candidate.

It is possible to express the present disclosure as an equalization method which is carried out in a radio communication apparatus. It is also possible to express the present disclosure as an equalizer which is an apparatus having a function to carry out an equalization method or a program which makes a computer carry out an equalization method or function as an equalizer. In other words, it is possible to express the present disclosure in any category of an apparatus, a method, and a program.

The present disclosure makes it possible to reduce an amount of operations needed for equalization in a receiver with multiple receiving antennas, and has an advantageous effect as an equalization method and an equalizer usable in a radio communication apparatus in, for example, a millimeter wave radio communication.

What is claimed is:

1. An equalization method comprising:
in a receiver with multiple antennas,
carrying out frequency domain conversion of M received signals received by multiple antennas into a 2M received vector having 2M elements;
calculating a 2M channel vector and a (2M)×(2M) noise/interference matrix by carrying out channel estimation and noise/interference estimation based on the 2M received vector;
selecting a 2M−1 or less channel vector from the calculated 2M channel vector and selecting a (2M−1)×(2M−1) or less noise/interference matrix from the calculated (2M)×(2M) noise/interference matrix, based on quality of the received signals;
calculating a 2M−1 or less equalization coefficient vector as equalization coefficients based on the 2M−1 or less channel vector and the (2M−1)×(2M−1) or less noise/interference matrix;
selecting a 2M−1 or less received vector from the 2M received vector; and
equalizing the 2M−1 or less received vector by using the equalization coefficients.

2. The equalization method according to claim 1, wherein the calculating of the equalization coefficients is carried out based on MMSE by using one of matrix operation processing and scalar operation processing, which are switched based on quality of the received signals.

3. The equalization method according to claim 1, wherein the selecting of the 2M−1 or less received vector, the 2M−1 or less channel vector, or the (2M−1)×(2M−1) or less noise/interference matrix is carried out by using any one of the following methods:
(1) selection for each frequency bin based on SINRs of respective frequencies of the respective received signals;
(2) selection for each frequency bin based on SINRs and received signal powers of respective frequencies of the respective received signals;
(3) based on a mean value of SINRs in a predefined range of frequency bins of the respective received signals, selection for each of the predefined ranges of frequency bins;
(4) based on a mean values of SINRs and a mean value of received signal powers in a predefined range of frequency bins of the respective received signals, selection for each of the predefined ranges of frequency bins; and
(5) switching between selection for each frequency bin based on SINRs of respective frequencies of the respective received signals and, based on a mean value of SINRs in a predefined range of frequency bins of the respective received signals, selection for each of the predefined ranges of frequency bins.

4. The equalization method according to claim 1, the method further comprising:
replacing a portion of the 2M−1 or less channel vector and a portion of the (2M−1)×(2M−1) or less noise/interference matrix with zeros;

calculating the 2M−1 or less equalization coefficient vector as the equalization coefficients based on both the 2M−1 or less channel vector, the portion of which is replaced with zeros, and the (2M−1)×(2M−1) or less noise/interference matrix, the portion of which is replaced with zeros;

replacing a portion of the 2M−1 or less received vector with zeros; and equalizing the 2M−1 or less received vector, the portion of which is replaced with zeros, by using the equalization coefficients.

5. The equalization method according to claim 1, the method further comprising:

selecting a 2M−2 or less channel vector from the calculated 2M channel, vector and selecting a (2M−2)×(2M−2) or less noise/interference matrix from the calculated (2M)×(2M) noise/interference matrix, based on quality of the received signals;

calculating a 2M−2 or less equalization coefficient vector as second equalization coefficients based on the 2M−2 or less channel vector and the (2M−2)×(2M−2) or less noise/interference matrix;

selecting a 2M−2 or less received vector from the 2M received vector;

equalizing the 2M−2 or less received vector by using the second equalization coefficients; and switching between a first equalization method in which the 2M−1 or less received vector is equalized by using the equalization coefficients and a second equalization method in which the 2M−2 or less received vector is equalized by using the second equalization coefficients, based on a predefined criterion.

6. An equalizer comprising:

a frequency domain converter which carries out frequency domain conversion of M received signals received by multiple antennas into a 2M received vector having 2M elements;

a channel and noise/interference estimator which carries out channel estimation and noise/interference estimation based on the 2M received vector to calculate a 2M channel vector and a (2M)×(2M) noise/interference matrix;

a first selector which selects a 2M−1 or less channel vector from the calculated 2M channel vector and selects a (2M−1)×(2M−1) or less noise/interference matrix from the calculated (2M)×(2M) noise/interference matrix, based on quality of the received signals;

an equalization coefficient calculator which calculates 2M−1 or less equalization coefficient vector as equalization coefficients based on the 2M−1 channel vector and the (2M−1)×(2M−1) or less noise/interference matrix;

a second selector which selects a 2M−1 or less received vector from the 2M received vector; and a frequency domain equalizer which equalizes the 2M−1 or less received vector by using the equalization coefficients.

7. The equalizer according to claim 6, wherein the equalization coefficient calculator calculates the equalization coefficient based on MMSE by using one of matrix operation processing and scalar operation processing, which are switched based on quality of the received signals.

8. The equalizer according to claim 6, wherein the 2M−1 or less received vector, the 2M−1 or less channel vector, or the (2M−1)×(2M−1) or less noise/interference matrix by using any one of the following methods:

(1) selection for each frequency bin based on SINRs of respective frequencies of the respective received signals;

(2) selection for each frequency bin based on SINRs and received signal powers of respective frequencies of the respective received signals;

(3) based on a mean value of SINRs in a predefined range of frequency bins of the respective received signals, selection for each of the predefined ranges of frequency bins;

(4) based on a mean values of SINRs and a mean value of received signal powers in a predefined range of frequency bins of the respective received signals, selection for each of the predefined ranges of frequency bins; and (5) switching between selection for each frequency bin based on SINRs of respective frequencies of the respective received signals and, based on a mean value of SINRs in a predefined range of frequency bins of the respective received signals, selection for each of the predefined ranges of frequency bins.

9. The equalizer according to claim 6, further comprising:

a first zero replacer which replaces a portion of the 2M−1 or less channel vector and a portion of the (2M−1)×(2M−1) or less noise/interference matrix with zeros; and a second zero replacer which replaces a portion of the 2M−1 or less received vector with zeros, wherein the equalization coefficient calculator, based on both the 2M−1 or less channel vector, the portion of which as replaced with zeros, and the (2M−1)×(2M−1) or less noise/interference matrix, the portion of which is replaced with zeros, calculates the 2M−1 or less equalization coefficient vector as the equalization coefficients, and the frequency domain equalizer equalizes the 2M−1 or less received vector, the portion of which is replaced with zeros, by using the equalization coefficients.

10. The equalizer according to claim 6, further comprising:

a third selector which selects a 2M−2 or less channel vector from the calculated 2M channel vector and selects (2M−2)×(2M−2) or less noise/interference matrix from the calculated (2M)×(2M) noise/interference matrix, based on quality of the received signals;

a second equalization coefficient calculator which calculates a 2M−2 or less equalization coefficient vector as second equalization coefficients based on the 2M−2 or less channel vector and the (2M−2)×(2M−2) or less noise/interference matrix;

a fourth selector which selects a 2M−2 or less received vector from the 2M received vector;

a second frequency domain equalizer which equalizes the 2M−2 or less received vector by using the second equalization coefficients; and a controller which switches between equalization by the frequency domain equalizer and equalization by the second frequency domain equalizer.

* * * * *